(12) United States Patent
Shimizu et al.

(10) Patent No.: US 11,414,155 B2
(45) Date of Patent: Aug. 16, 2022

(54) REACTIVE FORCE GENERATION DEVICE OF CLUTCH-BY-WIRE SYSTEM AND CLUTCH LEVER DEVICE

(71) Applicant: HONDA MOTOR CO., LTD., Tokyo (JP)

(72) Inventors: Masahiro Shimizu, Wako (JP); Kuniaki Wakamatsu, Wako (JP); Yoshinobu Shiomi, Wako (JP); Akira Tokito, Wako (JP); Go Morita, Wako (JP); Junya Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/264,861

(22) PCT Filed: May 24, 2019

(86) PCT No.: PCT/JP2019/020682
§ 371 (c)(1),
(2) Date: Feb. 1, 2021

(87) PCT Pub. No.: WO2020/031464
PCT Pub. Date: Feb. 13, 2020

(65) Prior Publication Data
US 2021/0309317 A1      Oct. 7, 2021

(30) Foreign Application Priority Data

Aug. 10, 2018 (JP) .............................. JP2018-151509
Feb. 28, 2019 (JP) .............................. JP2019-036015

(51) Int. Cl.
*B62K 23/06* (2006.01)
*G05G 5/03* (2008.04)

(52) U.S. Cl.
CPC .............. *B62K 23/06* (2013.01); *G05G 5/03* (2013.01)

(58) Field of Classification Search
None
See application file for complete search history.

(56) References Cited

U.S. PATENT DOCUMENTS 2,148,271 A * 2/1939 Kliesrath .............. B60K 23/02
192/109 R
6,457,378 B2 * 10/2002 Hatakoshi ............. B62K 23/06
74/489

(Continued)

FOREIGN PATENT DOCUMENTS

EP        2988959        3/2016
JP        2010-215085    9/2010

(Continued)

OTHER PUBLICATIONS

International Search Report and Written Opinion for International Application No. PCT/JP2019/020682 dated Jul. 30, 2019, 5 pages.

(Continued)

*Primary Examiner* — Vicky A Johnson
(74) *Attorney, Agent, or Firm* — Amin, Turocy & Watson, LLP

(57) ABSTRACT

A reactive force generation device (130) of clutch-by-wire system is a reactive force generation device which generates a reactive force on a clutch lever (51), and includes a piston structure in which an air bleeding hole (139) is provided, and a contact member (133) which is in contact with the clutch lever (51) and in which the air bleeding hole 139 is formed.

12 Claims, 15 Drawing Sheets

(56) References Cited

U.S. PATENT DOCUMENTS

| | | | |
|---|---|---|---|
| 7,476,176 B2 | 1/2009 | Ibamoto et al. | |
| 2010/0234178 A1 | 9/2010 | Hayakawa et al. | |
| 2012/0161420 A1* | 6/2012 | Eberlein | B60T 11/18 |
| | | | 280/288.4 |
| 2016/0288864 A1 | 10/2016 | Kajihara et al. | |

FOREIGN PATENT DOCUMENTS

| | | |
|---|---|---|
| JP | 2013-057404 | 3/2013 |
| JP | 2013-256263 | 12/2013 |
| WO | 2012/117517 | 9/2012 |
| WO | 2014/176371 | 10/2014 |
| WO | 2017/119328 | 7/2017 |

OTHER PUBLICATIONS

Indian Office Action for Indian Patent Application No. 202117004430 dated Apr. 12, 2021.
European Office Action for European Patent Application No. 19847743.2 dated Jul. 16, 2021.

\* cited by examiner

REACTIVE FORCE GENERATION DEVICE OF CLUTCH-BY-WIRE SYSTEM AND CLUTCH LEVER DEVICE

TECHNICAL FIELD

The present invention relates to a reactive force generation device of a clutch-by-wire system, and a clutch lever device.

Priority is claimed on Japanese Patent Application No. 2018-151509, filed Aug. 10, 2018 and Japanese Patent Application No. 2019-036015, filed Feb. 28, 2019, the content of which is incorporated herein by reference.

BACKGROUND ART

Conventionally, there is a clutch-by-wire system which electrically connects a clutch lever to a clutch device. For example, the clutch-by-wire system includes an actuator which drives the clutch device, an operation amount detection unit which detects an operation amount of the clutch lever, and an electronic control unit which controls an operation of the actuator on the basis of a detection value of the operation amount detection unit.

As the clutch-by-wire system, there is one including a mechanism for applying an operation reactive force to the clutch lever in order to produce an operation load of a conventional clutch lever mechanically connected to the clutch device by hydraulic pressure, a cable or the like (refer to, for example, Patent Literature 1). In Patent Literature 1, a transmission device including a clutch lever, and a plurality of coil springs which gradually change a rate of increase of the operation reactive force of the clutch lever using an action of respective biasing forces thereof in a stepwise manner is disclosed. This transmission device has a constitution in which the coil springs are disposed in a lever cylinder, and a piston linked to the clutch lever is biased by the coil springs.

CITATION LIST

Patent Literature

[Patent Literature 1]
Japanese Unexamined Patent Application, First Publication No. 2013-57404

SUMMARY OF INVENTION

Technical Problem

Incidentally, when a reactive force generation device which generates an operation reactive force of the clutch lever has a piston structure as in the above-described related art, an air bleeding hole through which air enters and exits according to volume changes when the piston moves may be provided. However, foreign substances such as water or dust may enter the inside of the piston structure through the air bleeding hole, and performance in the function of the reactive force generation device may be deteriorated.

Therefore, the present invention provides a reactive force generation device of a clutch-by-wire system and a clutch lever device capable of curbing entry of foreign substances into a piston structure.

Solution to Problem (1) A reactive force generation device of a clutch-by-wire system according to an aspect of the present invention is a reactive force generation device (130) which generates a reactive force on a clutch lever (51), and includes a piston structure in which an air bleeding hole (139) is provided, and a contact member (133) which is in contact with the clutch lever (51) and in which the air bleeding hole 139 is formed.

With such a constitution, the clutch lever is located in the vicinity of the air bleeding hole by forming the air bleeding hole in the contact member which comes into contact with the clutch lever. Therefore, the air bleeding hole is disposed at a position at which it is difficult to access from the outside because it is obstructed by the clutch lever. Therefore, it is possible to curb entry of foreign substances such as water and dust into the piston structure through the air bleeding hole.

(2) In the reactive force generation device of the clutch-by-wire system described in (1), the contact member (133) may have a contact surface (138) which comes into contact with the clutch lever (51) and in which the air bleeding hole (139) opens, and the contact surface (138) may face the rear of a vehicle.

With such a constitution, since the air bleeding hole opens to the rear of the vehicle, it is possible to curb entry of foreign substances into the piston structure through the air bleeding hole when the vehicle is traveling, as compared with a constitution in which the air bleeding hole opens a front of the vehicle.

(3) In the reactive force generation device of the clutch-by-wire system described in (1) or (2), the contact member (133) may have a contact surface (138) which comes into contact with a roller (80) of the clutch lever (51) and in which the air bleeding hole (139) opens, and the roller (80) may roll on the contact surface (138) according to an operation of the clutch lever (51).

With such a constitution, the air bleeding hole is provided at a position at which it is closer to the clutch lever. Therefore, the air bleeding hole is disposed at a position at which it is more difficult to access from the outside. Therefore, it is possible to curb the entry of foreign substances such as water and dust into the piston structure through the air bleeding hole.

(4) In the reactive force generation device of the clutch-by-wire system described in (3), the air bleeding hole (139) may be formed in a region in which the roller (80) comes into contact.

With such a constitution, since the air bleeding hole is blocked by the roller when the clutch lever is operated, it is possible to curb the entry of foreign substances into the piston structure through the air bleeding hole when the clutch lever is operated.

(5) In the reactive force generation device of the clutch-by-wire system described in any one of (1) to (4), a labyrinth structure which obstructs a flow of a fluid through the air bleeding hole (139) may be formed on the contact member (133).

With such a constitution, it is possible to effectively curb the entry of foreign substances such as water and dust into the piston structure through the air bleeding hole.

(6) In the reactive force generation device of the clutch-by-wire system described in (5), the labyrinth structure may have a flow passage (142) which communicates with the air bleeding hole (139) and extends spirally.

With such a constitution, for example, as compared with a constitution in which the flow passage extends linearly, it is possible to effectively curb advance of foreign substances, such as water or dust which has entered the air bleeding hole, through the flow passage. Therefore, it is possible to curb the entry of foreign substances into the piston structure.

(7) In the reactive force generation device of the clutch-by-wire system described in any one of (1) to (6), a holding member (131) which holds the contact member (133) and constitutes a piston structure together with the contact member (133), a coil spring (151) which is interposed between the contact member (133) and the holding member (131) and presses the contact member (133) at a first end portion thereof, and an adjuster (360) which is provided on the holding member (131) and causes a second end portion of the coil spring (151) to come closer to and separate from the first end portion may be included.

With such a constitution, the adjuster can change a length between both end portions of the coil spring to adjust a force for pressing the contact member. Therefore, it is possible to provide the reactive force generation device which can freely change the reactive force applied to the clutch lever.

(8) A clutch lever device according to an aspect of the present invention is a clutch lever device which includes the reactive force generation device (130) of the clutch-by-wire system described in any one of (1) to (7), including a clutch lever (51) which rotates around a rotation axis (O) and to which a reactive force is applied by the reactive force generation device (130), and a lever holder (210) which rotatably supports the clutch lever (51) and surrounds a contact portion in which the clutch lever (51) and the contact member (133) come into contact with each other, wherein an opening portion (211) into which the clutch lever (51) is inserted is formed in the lever holder (210), the clutch lever (51) has an facing surface (71a) which faces an opening edge (211a) of the opening portion (211) in a direction orthogonal to the rotation axis (O), and the facing surface (71a) continuously faces the opening edge (211a) of the opening portion (211) from a state in which the clutch lever (51) is not being operated to a state in which the clutch lever (51) is being operated and extends in an arc shape centered on the rotation axis (O) when seen in a direction in which the rotation axis (O) extends.

With such a constitution, a distance of a gap between the clutch lever and the opening edge of the lever holder can be kept constant regardless of an amount of operation of the clutch lever. Thus, it is possible to curb easy entry of foreign substances into the lever holder by operating the clutch lever as the gap between the clutch lever and the opening edge of the opening portion changes. Therefore, it is possible to curb occurrence of defects such as biting of foreign substances.

(9) In the clutch lever device described in (8), the facing surface (71a) may face a front opening edge (117a) of the opening portion (211).

With such a constitution, it is possible to effectively curb the entry of foreign substances or the like approaching the lever holder from the front side into the lever holder when the vehicle is traveling.

(10) A clutch lever device according to an aspect of the present invention is a clutch lever device which includes the reactive force generation device (130) of the clutch-by-wire system described in any one of (1) to (7), including a clutch lever (51) which rotates around a rotation axis (O) and to which a reactive force is applied by the reactive force generation device (130), and a lever holder (210) which rotatably supports the clutch lever (51) and surrounds a contact portion in which the clutch lever (51) and the contact member (133) come into contact with each other, wherein the lever holder (210) includes a lower surface (210a) which defines from below a space in which a contact portion in which the clutch lever (51) and the contact member (133) come into contact with each other is disposed, a communication portion (212) which allows communication between an inside and an outside the lever holder (210) is formed in the lower surface (210a), and the lower surface (210a) is inclined to descend toward the communication portion (212).

With such a constitution, foreign substances which have entered the space in which the contact portion in which the clutch lever and the contact member comes into contact with each other is disposed can be smoothly guided to the communication portion by an inclination of the lower surface of the lever holder. Therefore, even when the foreign substances have entered the inside of the lever holder, the foreign substances can be effectively discharged through the communication portion, and occurrence of defects such as the biting of the foreign substances can be curbed.

Advantageous Effects of Invention

According to the reactive force generation device of the clutch-by-wire system and the clutch lever device, it is possible to curb entry of foreign substances into a piston structure.

DESCRIPTION OF EMBODIMENTS

Figure 1:
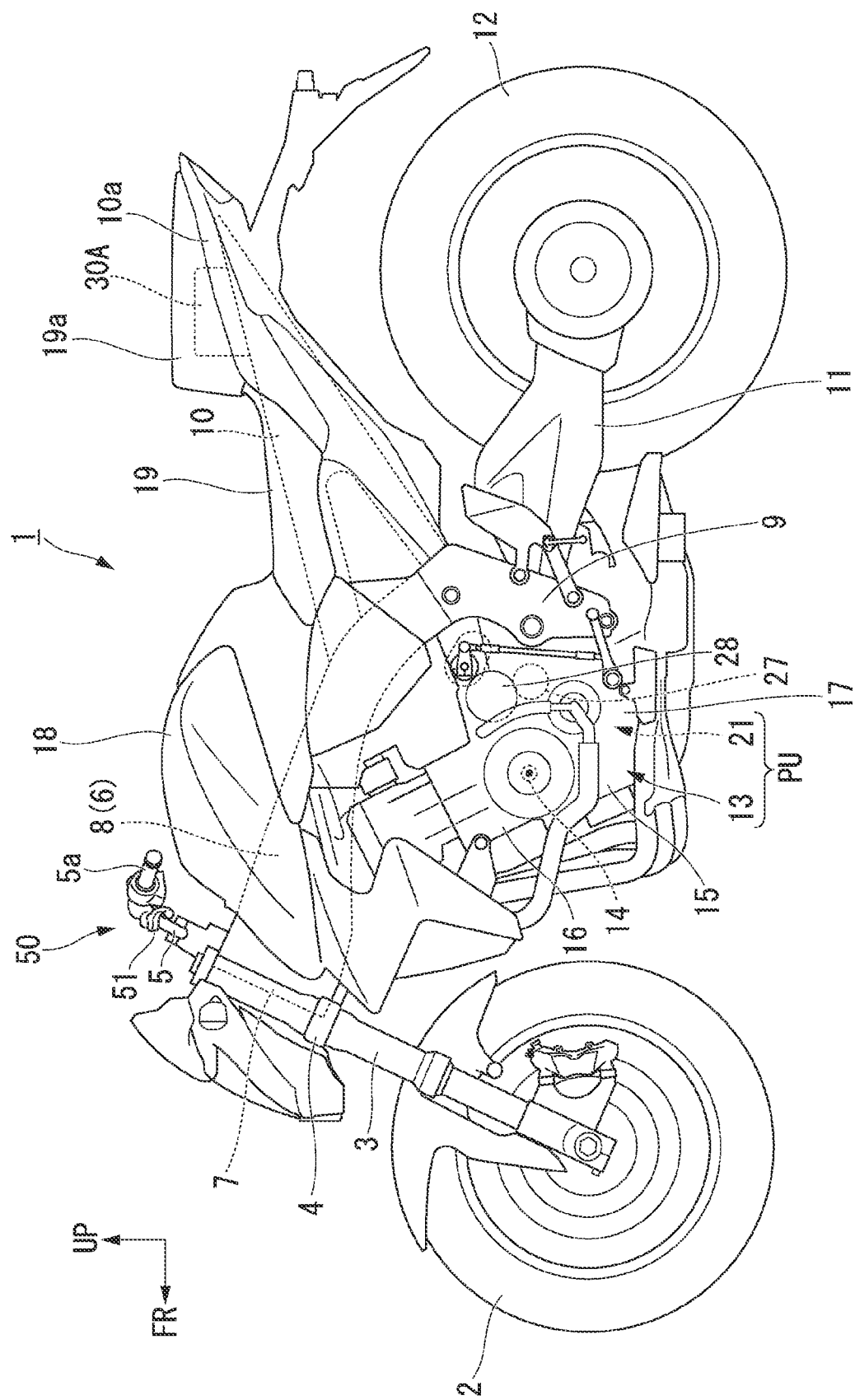
FIG. 1 is a left side view of a motorcycle of a first embodiment.

Hereinafter, embodiments of the present invention are described with reference to the drawings. In the following description, directions such as forward, rearward, right and left are the same as those in a vehicle described below unless otherwise noted. Also, in the drawings used for the following description, an arrow FR indicating a front of the vehicle, an arrow LH indicating a left side of the vehicle, and an arrow UP indicating an upper side of the vehicle are shown at appropriate positions.

First Embodiment

A motorcycle of a first embodiment will be described with reference to FIGS. 1 to 9.

Overall Constitution of Vehicle

FIG. 1 is a left side view of a motorcycle according to a first embodiment.

As shown in FIG. 1, this embodiment is applied to a motorcycle 1 which is a saddle-riding type vehicle. A front wheel 2 of the motorcycle 1 is supported by lower end portions of a pair of right and left front forks 3. An upper portion of the right and left front forks 3 is supported by a head pipe 7 of a front end portion of a vehicle body frame 6 via a steering stem 4. A steering handle bar 5 is installed on a top bridge of the steering stem 4. A grip portion 5a gripped by a driver is provided on each of right and left outer portions of the handle bar 5. In the embodiment, it is assumed that the grip portion 5a extends in a vehicle width direction (a right and left direction). However, the grip portion 5a may extend obliquely with respect to the vehicle width direction.

The vehicle body frame 6 includes the head pipe 7, a main tube 8 which extends downward and rearward from the head pipe 7 at a center in the vehicle width direction, right and left pivot frames 9 which extend downward from a rear end portion of the main tube 8, and a seat frame 10 which extends rearward from the main tube 8 and the right and left pivot frames 9. A front end portion of a swing arm 11 is pivotally supported by the right and left pivot frame 9 to be swingable. A rear wheel 12 of the motorcycle 1 is supported at a rear end portion of the swing arm 11.

A fuel tank 18 is supported above the right and left main tubes 8. A front seat 19 and a rear seat cover 19a are supported above the seat frame 10. The front seat 19 and the rear seat cover 19a are disposed at the front and the rear behind the fuel tank 18. The surroundings of the seat frame 10 are covered with a rear cowl 10a. A power unit PU which is a prime mover of the motorcycle 1 is suspended below the right and left main tubes 8. The power unit PU is linked to the rear wheel 12 via a chain type transmission mechanism, for example.

The power unit PU integrally has an engine 13 located at a front portion and a transmission 21 located at a rear portion. The engine 13 is, for example, a multi-cylinder engine in which a rotation axis of a crankshaft 14 extends in the vehicle width direction. The engine 13 includes cylinders 16 which stand upward at a front portion of a crankcase 15. A rear portion of the crankcase 15 is a transmission case 17 which accommodates the transmission 21. The transmission 21 is a stepped transmission.

Figure 2:
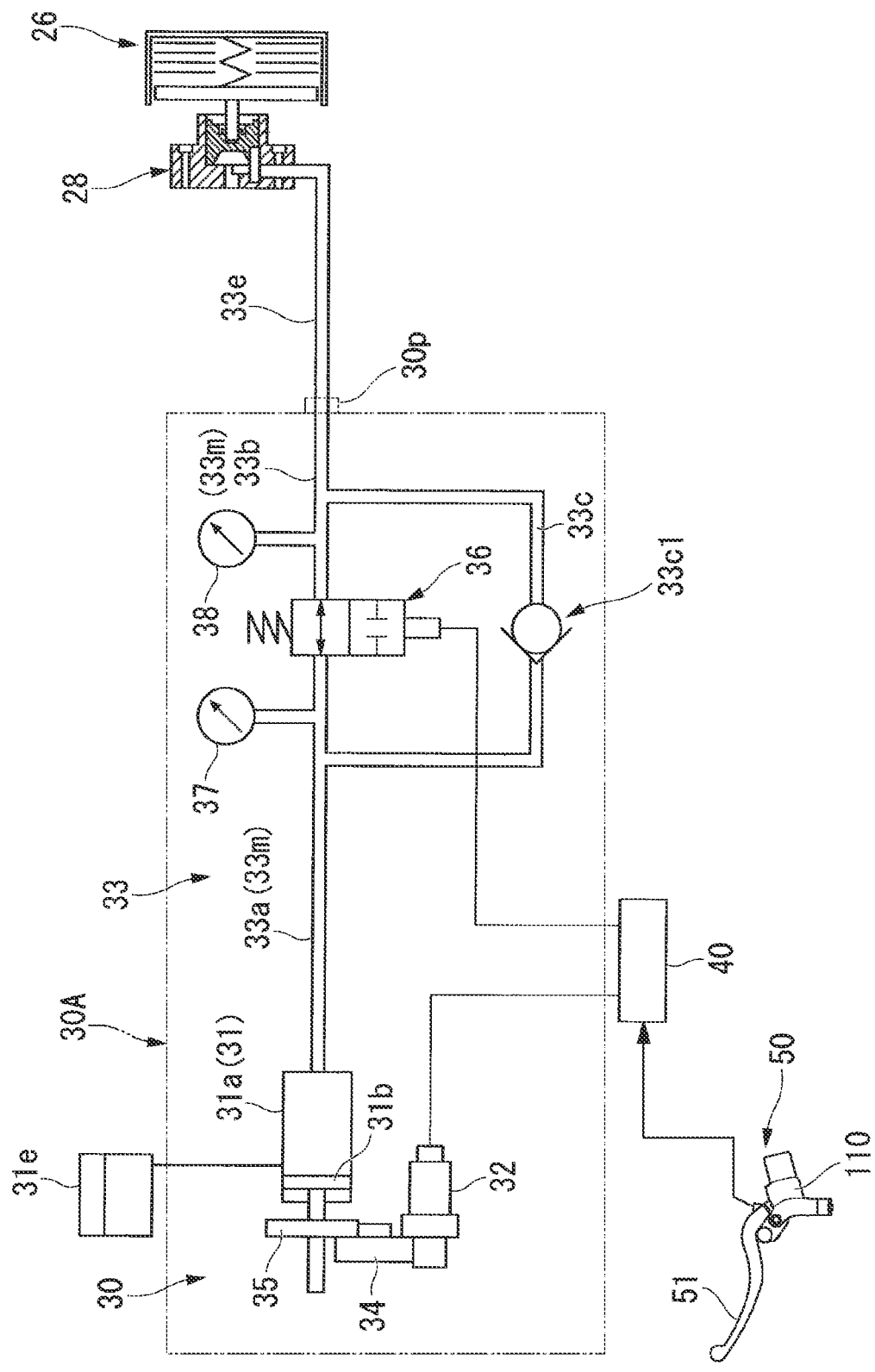
FIG. 2 is a schematic explanatory view of a clutch operation system including a clutch actuator.

FIG. 2 is a schematic explanatory view of a clutch operation system including a clutch actuator.

As shown in FIGS. 1 and 2, a clutch device 26 operated by a clutch actuator 30 is disposed in the transmission 21. The clutch device 26 is, for example, a wet type multi-disk clutch and is a so-called normally open clutch. That is, the clutch device 26 is brought into a connected state in which power can be transmitted due to hydraulic pressure supply from the clutch actuator 30 and then returns to a disconnected state in which power transmission is not possible when the hydraulic pressure supply from the clutch actuator 30 is cut off.

Rotational power of the crankshaft 14 is transmitted to the transmission 21 via the clutch device 26. A drive sprocket 27 of the chain type transmission mechanism is installed in the transmission 21.

Transmission System

Here, a transmission system of the motorcycle 1 includes the clutch actuator 30, an electronic control unit (ECU) 40, and a clutch lever device 50.

As shown in FIG. 2, as an operation of the clutch actuator 30 is controlled by the ECU 40, a fluid pressure by which the clutch device 26 is connected or disconnected can be controlled. The clutch actuator 30 includes an electric motor 32 (hereinafter, simply referred to as a motor 32) as a drive source, and a master cylinder 31 driven by the motor 32. The clutch actuator 30 constitutes an integral clutch control unit 30A together with a hydraulic circuit device 33 provided between the master cylinder 31 and a hydraulic supply/discharge port 30p.

The ECU 40 calculates a target value (a target hydraulic pressure) of the hydraulic pressure to be supplied to a slave cylinder 28 to connect or disconnect the clutch device 26 on the basis of a detection value of a rotation sensor 160 and a preset calculation program which will be described later. The ECU 40 controls the clutch control unit 30A so that the hydraulic pressure (a slave hydraulic pressure) on the slave cylinder 28 side which is detected by a downstream side hydraulic pressure sensor 38 approaches the target hydraulic pressure.

The master cylinder 31 causes stroking of a piston 31b in a cylinder body 31a due to driving of the motor 32 so that working oil in the cylinder body 31a can be supplied to and discharged from the slave cylinder 28. In the drawing, a reference numeral 35 indicates a conversion mechanism as a ball screw mechanism, a reference numeral 34 indicates a transmission mechanism extending across the motor 32 and the conversion mechanism 35, and a reference numeral 31e indicates a reservoir connected to the master cylinder 31.

The hydraulic circuit device 33 has a valve mechanism (a solenoid valve 36) for opening or blocking an intermediate portion of a main oil passage 33m extending from the master cylinder 31 to the clutch device 26 side (the slave cylinder 28 side). The main oil passage 33m of the hydraulic circuit device 33 can be divided into an upstream side oil passage 33a located on the master cylinder 31 side of the solenoid valve 36 and a downstream side oil passage 33b located on the slave cylinder 28 side of the solenoid valve 36. The hydraulic circuit device 33 further includes a bypass oil passage 33c which bypasses the solenoid valve 36 and allows communication between the upstream side oil passage 33a and the downstream side oil passage 33b.

The solenoid valve 36 is a so-called normally open valve. A one-way valve 33c1 which allows the working oil to flow only in a direction from the upstream side to the downstream side is provided in the bypass oil passage 33c. An upstream side hydraulic pressure sensor 37 for detecting a hydraulic pressure of the upstream side oil passage 33a is provided on the upstream side of the solenoid valve 36. The downstream side hydraulic pressure sensor 38 for detecting a hydraulic pressure of the downstream side oil passage 33b is provided on the downstream side of the solenoid valve 36.

As shown in FIG. 1, the clutch control unit 30A is accommodated in the rear cowl 10a, for example. The slave cylinder 28 is installed on the left side of the rear part of the crankcase 15. The clutch control unit 30A and the slave cylinder 28 are connected via a hydraulic pipe 33e (refer to FIG. 2).

As shown in FIG. 2, when the hydraulic pressure is supplied from the clutch actuator 30, the slave cylinder 28 operates the clutch device 26 such that it is brought into the connected state. When the hydraulic pressure supply is cut off, the slave cylinder 28 returns the clutch device 26 to the disconnected state.

In order to maintain the clutch device 26 in the connected state, it is necessary to continue the hydraulic pressure supply, but electric power is consumed correspondingly. Therefore, the solenoid valve 36 is provided in the hydraulic circuit device 33 of the clutch control unit 30A, and the solenoid valve 36 is closed after the hydraulic pressure is supplied to the clutch device 26 side. Accordingly, energy consumption is minimized by maintaining the hydraulic pressure supplied to the clutch device 26 side and supplementing the hydraulic pressure according to a pressure drop (recharging according to a leakage amount).

Overall Constitution of Clutch Lever Device

Figure 3:
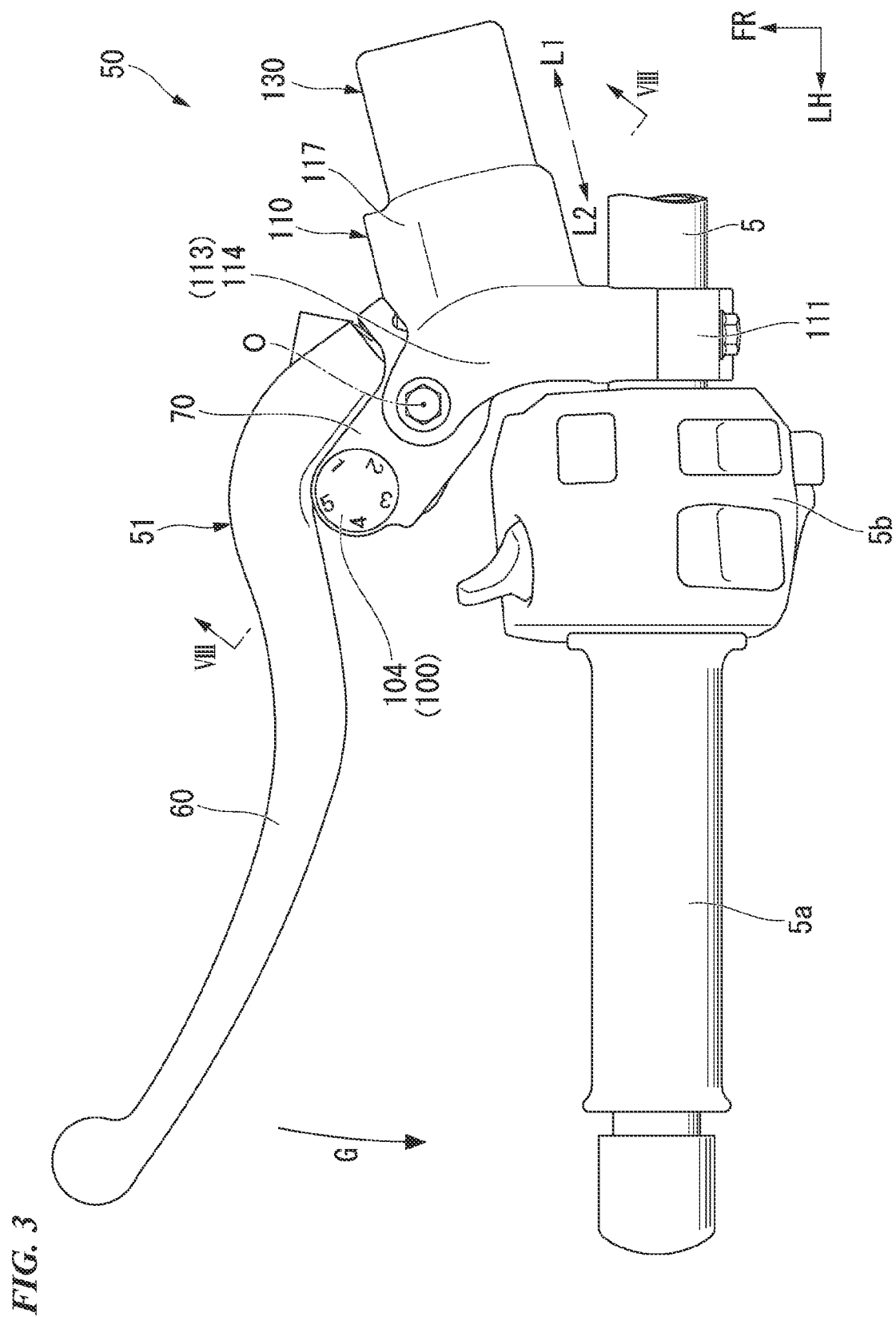
FIG. 3 is a plan view of the surroundings of a clutch lever device of the first embodiment.

FIG. 3 is a plan view of the surroundings of the clutch lever device of the first embodiment.

As shown in FIG. 3, the clutch lever device 50 is installed on the handle bar 5 to be parallel with the left grip portion 5a. The clutch lever device 50 serves as an operator for transmitting a clutch operation request signal to the ECU 40 without a mechanical connection with the clutch device 26 using a cable, a hydraulic pressure, or the like. That is, the motorcycle 1 employs a clutch-by-wire system in which the clutch device 26 and a clutch lever 51 which will be described later are electrically connected.

Figure 4:
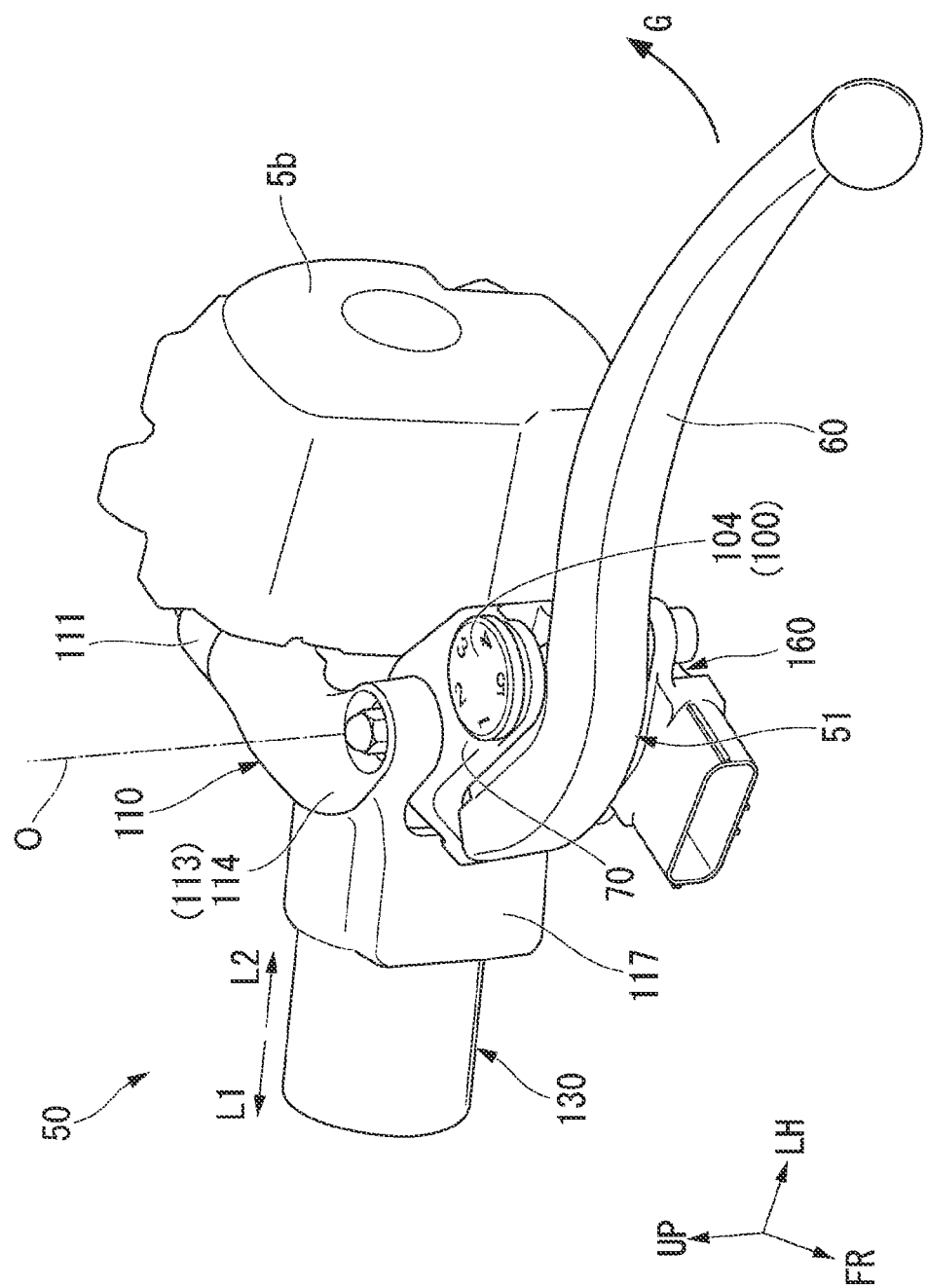
FIG. 4 is a perspective view of a clutch lever device of the first embodiment when seen from above and in front.
Figure 5:
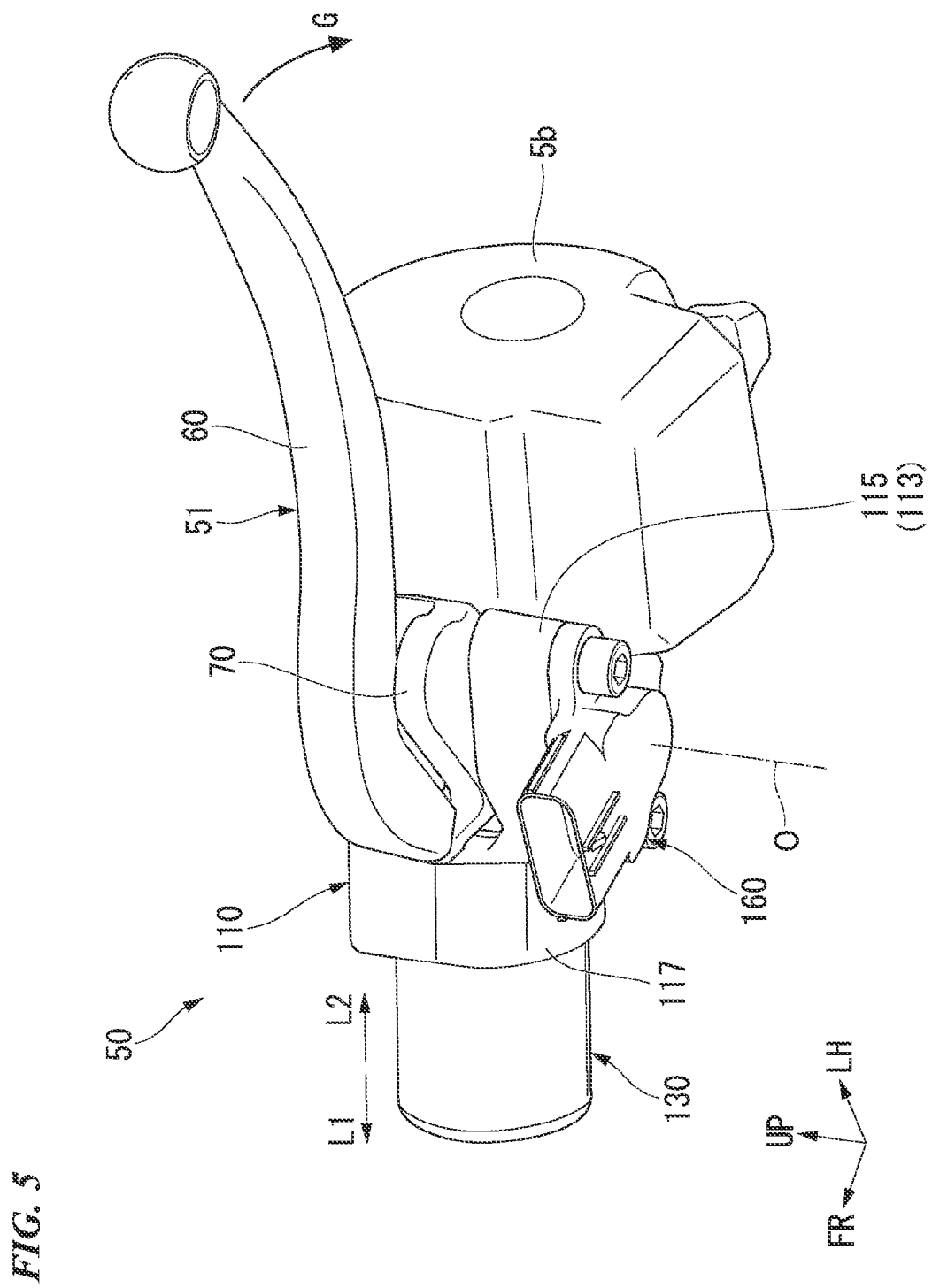
FIG. 5 is a perspective view of the clutch lever device of the first embodiment when seen from below and in front.

FIG. 4 is a perspective view of the clutch lever device of the first embodiment when seen from above and in front.
FIG. 5 is a perspective view of the clutch lever device of the first embodiment when seen from below and in front.

As shown in FIGS. 3 to 5, the clutch lever device 50 includes a clutch lever 51 which is operated by an occupant to rotate around a rotation axis O, a lever holder 110 which rotatably supports the clutch lever 51, a reactive force generation device 130 which has a piston structure and generates an operation reactive force on the clutch lever 51, and a rotation sensor 160 which detects a rotation angle of the clutch lever 51.

In the following description of the clutch lever device 50, a state in which the clutch lever 51 is not being operated (a state shown in FIGS. 3 to 8) will be described unless otherwise noted. Further, regarding a rotational position of the clutch lever 51, a position of the state in which the clutch lever 51 is not being operated is referred to as a pre-operation position. Further, regarding a circumferential direction around the rotation axis O, a direction in which the clutch lever 51 rotates from the pre-operation position when the clutch lever 51 is operated is defined as an operation direction G. Further, in the following description, a direction in which the rotation axis O extends is referred to as an axial direction. The axial direction is a direction along a vertical direction and is at least a direction inclined with respect to a horizontal direction. In the embodiment, the axial direction is the vertical direction.

Hereinafter, the clutch lever device 50 will be described in detail.

Lever Holder

The lever holder 110 is installed on the inner side (the right side) in the vehicle width direction with respect to the left grip portion 5a of the handle bar 5. The lever holder 110 includes a fixed portion 111 which is fixed to the handle bar 5, a lever support portion 113 which extends from the fixed portion 111 to support the clutch lever 51, a piston holding portion 117 which is connected to the fixed portion 111 and the lever support portion 113 and holds a piston 133 (refer to FIG. 6) of the reactive force generation device 130, and a rotation sensor holding portion 124 (refer to FIG. 8) which holds the rotation sensor 160.

As shown in FIG. 3, the fixed portion 111 is fixed to the handle bar 5 on the side opposite to the left grip portion 5a with a switch box 5b interposed therebetween. The fixed portion 111 includes a front half body fitted to a front half peripheral surface of the handle bar 5, and a rear half body fitted to a rear half peripheral surface of the handle bar 5. The front half body and the rear half body of the fixed portion 111 are connected to each other by bolts to sandwich the handle bar 5.

As shown in FIGS. 3 to 5, the lever support portion 113 extends from the fixed portion 111 in a direction orthogonal to the axial direction. The lever support portion 113 includes an upper support portion 114 and a lower support portion 115 which extend parallel to each other with an interval therebetween in the axial direction to sandwich a base of the clutch lever 51. The upper support portion 114 and the lower support portion 115 extend forward from the fixed portion 111, then are bent and extend forward and outward in the vehicle width direction when seen in the vertical direction. The lower support portion 115 extends longer than the upper support portion 114. A through hole 113a (refer to FIG. 8) coaxial with the rotation axis O is formed in the upper support portion 114 and the lower support portion 115.

The piston holding portion 117 is formed in a cylindrical shape and extends inward from the lever support portion 113 in the vehicle width direction. Hereinafter, a direction in which the piston holding portion 117 extends from the lever support portion 113 is defined as a first direction L1, and a direction opposite to the first direction L1 is defined as a second direction L2. In the embodiment, the first direction L1 is a direction which is directed forward with respect to inward in the vehicle width direction. Further, the second direction L2 is a direction which is directed rearward with respect to outward in the vehicle width direction.

Figure 6:
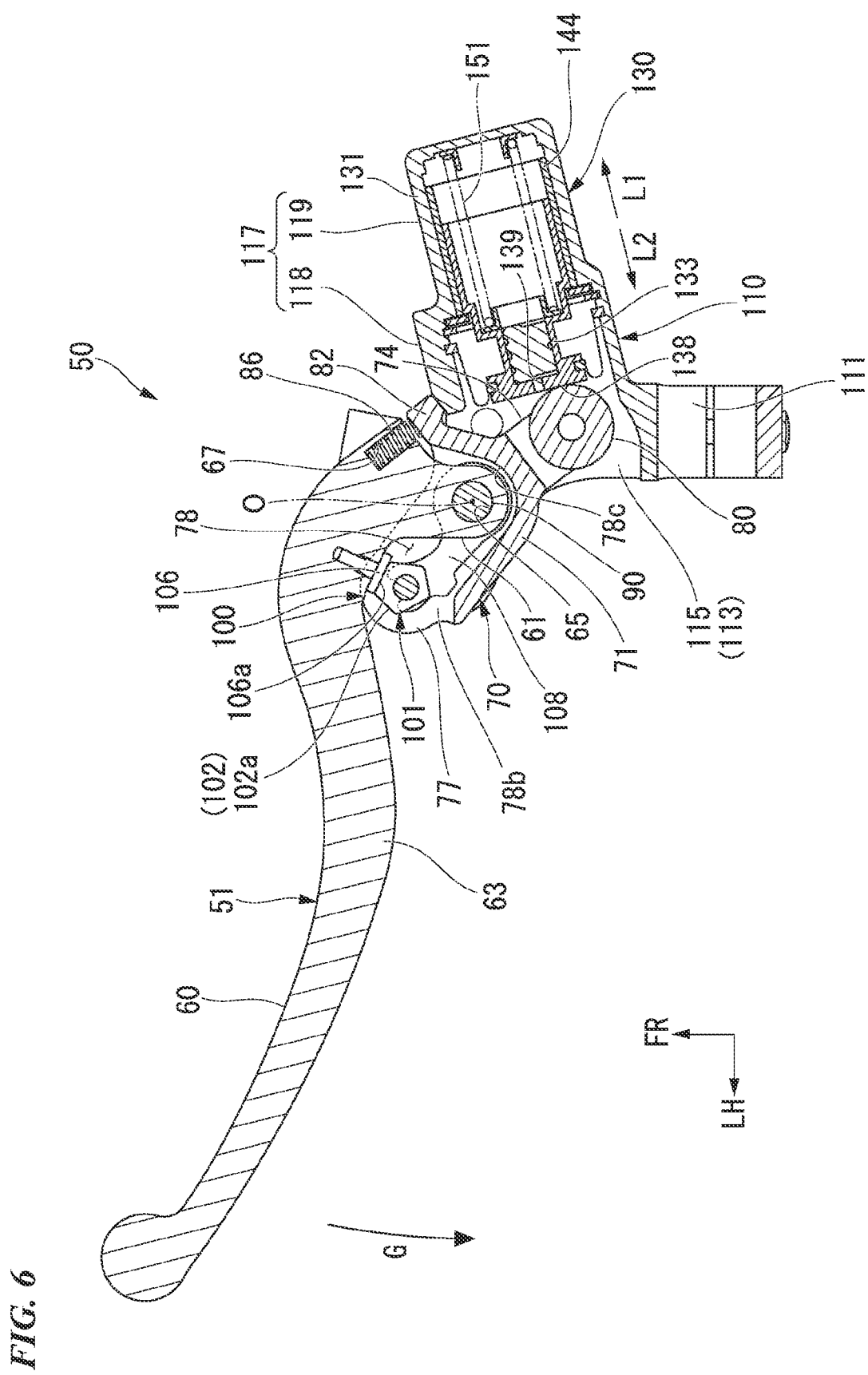
FIG. 6 is a cross-sectional view of the clutch lever device of the first embodiment when seen from above.

FIG. 6 is a cross-sectional view of the clutch lever device of the first embodiment when seen from above.

As shown in FIGS. 3 and 6, the piston holding portion 117 is coupled to the fixed portion 111, the upper support portion 114, and the lower support portion 115. An end portion of the piston holding portion 117 in the second direction L2 opens to a space between the upper support portion 114 and the lower support portion 115. The lever holder 110 surrounds a contact portion in which the clutch lever 51 and the piston 133 of the reactive force generation device 130 come into contact with each other by the lever support portion 113 and the piston holding portion 117. An end portion of the piston holding portion 117 in the first direction L1 is closed.

As shown in FIG. 6, the piston holding portion 117 includes a first tubular portion 118 and a second tubular portion 119. The first tubular portion 118 is a portion of the piston holding portion 117 in the second direction L2. The first tubular portion 118 is connected to the fixed portion 111, the upper support portion 114 (refer to FIG. 3), and the lower support portion 115. The second tubular portion 119 is a portion of the piston holding portion 117 in the first direction L1. The second tubular portion 119 is connected to an end portion of the first tubular portion 118 in the first direction L1. The second tubular portion 119 is formed in a bottomed tubular shape which opens into a space inside the first tubular portion 118. An inner peripheral surface of the second tubular portion 119 has a smaller diameter than an inner peripheral surface of the first tubular portion 118. The second tubular portion 119 forms a cylinder 131 of the reactive force generation device 130 (details will be described later).

Figure 7:
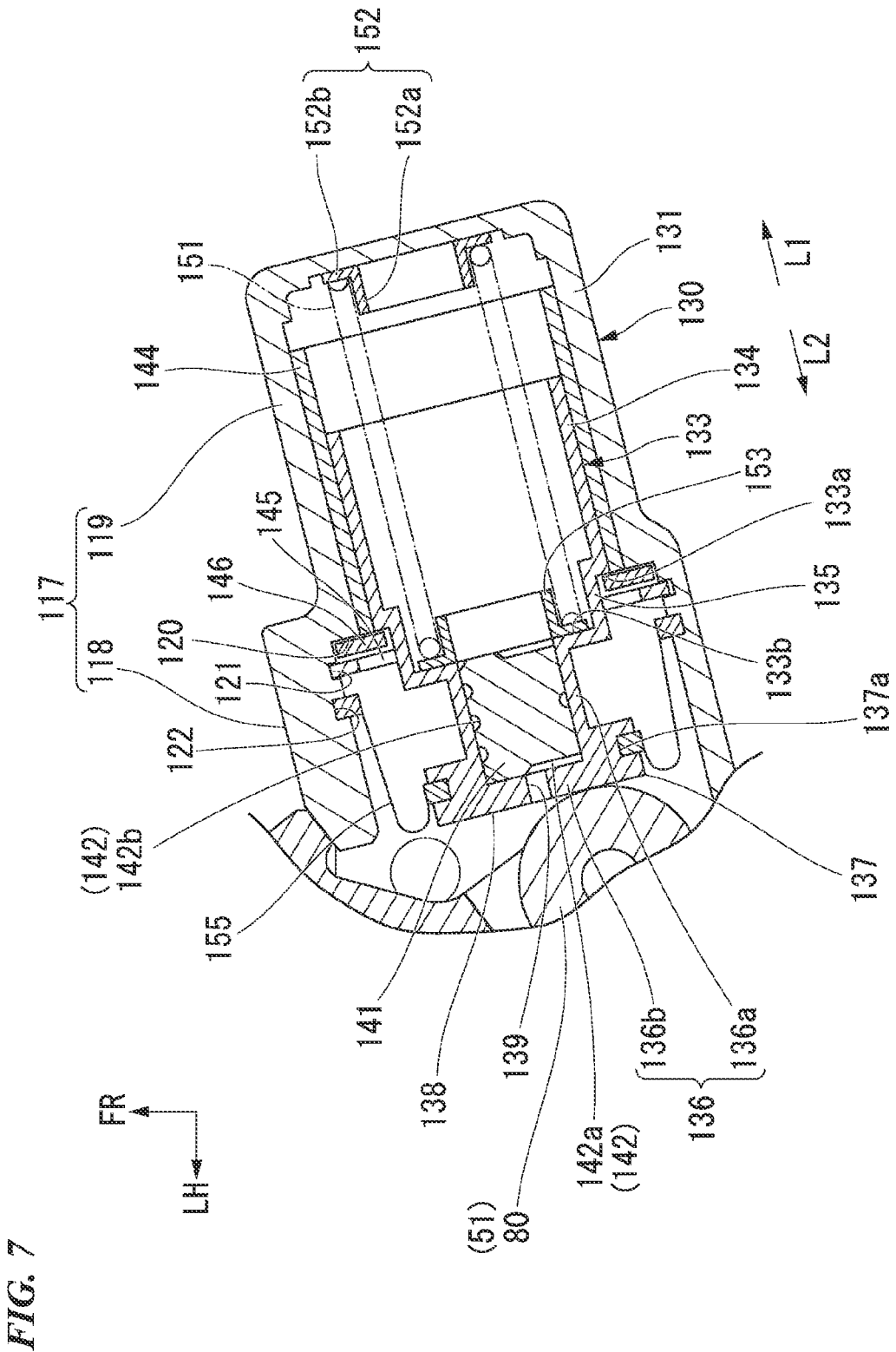
FIG. 7 is an enlarged cross-sectional view of the clutch lever device of the first embodiment.

FIG. 7 is an enlarged cross-sectional view of the clutch lever device of the first embodiment.

As shown in FIG. 7, a first stepped surface 120, a first groove 121, and a second groove 122 are formed on an inner peripheral surface of the piston holding portion 117. The first stepped surface 120 is provided between the inner peripheral surface of the first tubular portion 118 and the inner peripheral surface of the second tubular portion 119. The first stepped surface 120 is an end surface of the second tubular portion 119 in the second direction L2. The first stepped surface 120 is directed in the second direction L2. The first groove 121 and the second groove 122 are provided near an end portion of the inner peripheral surface of the first tubular portion 118 in the first direction L1. The first groove 121 and the second groove 122 extend in an annular shape over the entire circumference of the first tubular portion 118 in the circumferential direction. The first groove 121 is disposed at an interval with respect to the first stepped surface 120. The second groove 122 is disposed at an interval with respect to the first groove 121 and disposed on the side opposite to the first stepped surface 120 with the first groove 121 interposed therebetween. That is, the second groove 122 is formed in the second direction L2 with respect to the first groove 121.

Figure 8:
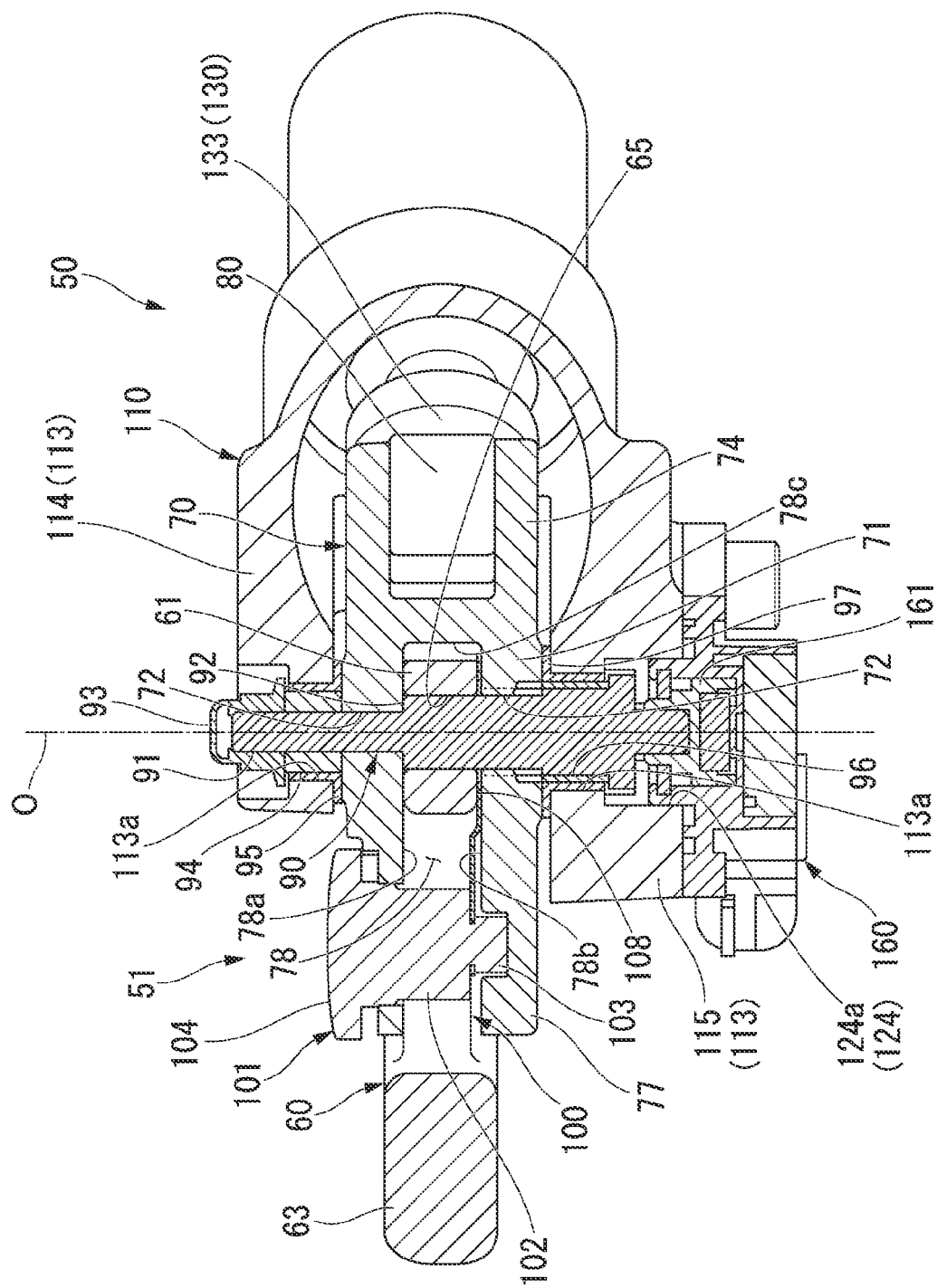
FIG. 8 is a cross-sectional view taken along line VIII-VIII of FIG. 3.

FIG. 8 is a cross-sectional view taken along line VIII-VIII of FIG. 3.

As shown in FIG. 8, the rotation sensor holding portion 124 is provided on the lever support portion 113. The rotation sensor holding portion 124 is provided on a lower surface of the lower support portion 115 of the lever support portion 113. The rotation sensor holding portion 124 includes a recessed portion 124a which is recessed upward. A lower end portion of the through hole 113a opens into the recessed portion 124a. A part of the rotation sensor 160 is inserted into the recessed portion 124a from below.

Reactive Force Generation Device

As shown in FIG. 7, the reactive force generation device 130 has a piston structure and elastically expands and contracts in the first direction L1 and the second direction L2 to apply an operation reactive force to the clutch lever 51. The reactive force generation device 130 includes a cylinder (holding member) 131 and a piston (a contact member) 133 which constitute the piston structure, an intermediate tube 144, and a spring (a coil spring) 151. The cylinder 131 is the second tubular portion 119 of the piston holding portion 117. The piston 133 is inserted inside the cylinder 131. The intermediate tube 144 is disposed between an inner peripheral surface of the cylinder 131 and an outer peripheral surface of the piston 133. The spring 151 is interposed between the cylinder 131 and the piston 133.

The piston 133 is a member with which the clutch lever 51 comes into contact. The piston 133 is formed in a bottomed cylindrical shape and is disposed coaxially with the cylinder 131. An end portion of the piston 133 in the first direction L1 opens to the space inside the cylinder 131. A diameter of an inner peripheral surface of the piston 133 gradually increases from an end portion thereof in the second direction L2 toward the first direction L1. The piston 133 includes a large diameter portion 134, a medium diameter portion 135, and a small diameter portion 136.

The large diameter portion 134 includes an end portion of the piston 133 in the first direction L1. The large diameter portion 134 is always disposed inside the cylinder 131 regardless of an expansion/contraction state of the reactive force generation device 130. An outer diameter of the large diameter portion 134 is smaller than an inner diameter of the cylinder 131. The large diameter portion 134 is formed to be smaller than the cylinder 131 in a direction parallel to the first direction L1. Thus, the large diameter portion 134 can move inside the cylinder 131 in both directions of the first direction L1 and the second direction L2.

The medium diameter portion 135 is adjacent to the large diameter portion 134. The medium diameter portion 135 is connected to an end portion of the large diameter portion 134 in the second direction L2. An inner diameter of the medium diameter portion 135 is smaller than an inner diameter of the large diameter portion 134. An outer diameter of the medium diameter portion 135 is smaller than the outer diameter of the large diameter portion 134. A second stepped surface 133a directed in the second direction L2 is formed between an outer peripheral surface of the medium diameter portion 135 and an outer peripheral surface of the large diameter portion 134.

The small diameter portion 136 includes an end portion of the piston 133 in the second direction L2. The small diameter portion 136 is adjacent to the medium diameter portion 135. The small diameter portion 136 is connected to an end portion of the medium diameter portion 135 in the second direction L2. The small diameter portion 136 has a peripheral wall 136a and a bottom wall 136b. An inner diameter of the peripheral wall 136a of the small diameter portion 136 is smaller than an inner diameter of the medium diameter portion 135. A third stepped surface 133b directed in the first direction L1 is formed between an inner peripheral surface of the peripheral wall 136a of the small diameter portion 136 and an inner peripheral surface of the medium diameter portion 135. A flange 137 which protrudes outward in a radial direction is formed at an end portion of the small diameter portion 136 in the second direction L2. The flange 137 extends over the entire circumference of the small diameter portion 136 in the circumferential direction. A third groove 137a is formed in an outer peripheral surface of the flange 137. The third groove 137a extends in an annular shape over the entire circumference of the small diameter portion 136 in the circumferential direction.

A surface of the flange 137 directed in the second direction L2 constitutes a tip end surface (a contact surface) 138 of the piston 133 together with a surface of the bottom wall 136b directed in the second direction L2. The tip end surface 138 of the piston is a flat surface. Since the second direction L2 is a direction directed rearward with respect to outward in the vehicle width direction, the tip end surface 138 of the piston is directed rearward with respect to outward in the vehicle width direction. The clutch lever 51 comes into contact with the tip end surface 138 of the piston 133. An air bleeding hole 139 is formed in the bottom wall 136b of the small diameter portion 136. The air bleeding hole 139 passes through the center of the bottom wall 136b and allows communication between the inside and the outside of the piston 133. The air bleeding hole 139 opens into a space surrounded by the lever holder 110 on the tip end surface 138 of the piston 133 (refer to FIG. 6).

A labyrinth structure which obstructs a flow of a fluid through the air bleeding hole 139 is formed in the piston 133. The labyrinth structure is formed by the small diameter portion 136 and a labyrinth member 141. The labyrinth member 141 is disposed inside the small diameter portion 136. The labyrinth member 141 is formed in a cylindrical shape which matches an internal shape of the small diameter portion 136. The labyrinth member 141 is fixed to the small diameter portion 136, for example, by being fitted inside the small diameter portion 136. The labyrinth structure includes a flow passage 142 which allows communication between the inside of the medium diameter portion 135 and the air bleeding hole 139 between an outer surface of the labyrinth member 141 and an inner surface of the small diameter portion 136. The flow passage 142 is formed by a first labyrinth groove 142a and a second labyrinth groove 142b formed on the outer surface of the labyrinth member 141, and the inner surface of the small diameter portion 136.

The first labyrinth groove 142a is formed in an end surface of the labyrinth member 141 in the second direction L2. The first labyrinth groove 142a extends from a position facing the air bleeding hole 139 to a position facing the inner peripheral surface of the peripheral wall 136a of the small diameter portion 136. The second labyrinth groove 142b is formed in an outer peripheral surface of the labyrinth member 141. The second labyrinth groove 142b is connected to an outer end portion of the first labyrinth groove 142a in the radial direction. The second labyrinth groove 142b extends spirally in the first direction L1 from an end edge of the labyrinth member 141 in the second direction L2 to an end edge of the labyrinth member 141 in the first direction L1. Thus, the flow passage 142 extends spirally around a center axis of the piston 133.

The intermediate tube 144 is formed in a cylindrical shape of which both end portions are open and is disposed coaxially with the piston 133. The intermediate tube 144 is airtightly fitted inside the cylinder 131. The intermediate tube 144 may be in sliding contact with the inner peripheral surface of the cylinder 131 or may be press-fitted into the inner peripheral surface of the cylinder 131. An inner peripheral surface of the intermediate tube 144 is airtightly in sliding contact with the outer peripheral surface of the large diameter portion 134 of the piston 133. The intermediate tube 144 is formed to be larger than the large diameter portion 134 of the piston 133 in a direction parallel to the first direction L1.

The piston 133 and the intermediate tube 144 are held inside the piston holding portion 117 by a snap ring 145 and a restricting ring 146. The snap ring 145 is fitted in the first groove 121 of the piston holding portion 117. The restricting ring 146 is formed in an annular shape and is disposed between the snap ring 145 and the first stepped surface 120 of the piston holding portion 117. The restricting ring 146 is restricted from moving in the second direction L2 by the snap ring 145 and is restricted from moving in the first direction L1 by the first stepped surface 120.

The medium diameter portion 135 of the piston 133 is inserted inside the snap ring 145 and the restricting ring 146. An inner diameter of the restricting ring 146 is smaller than the outer diameter of the large diameter portion 134 of the piston 133. Therefore, the restricting ring 146 can come into contact with an end edge of the intermediate tube 144 in the second direction L2 and the second stepped surface 133a of the piston 133 from the second direction L2. Additionally, the restricting ring 146 restricts coming out of the intermediate tube 144 and the large diameter portion 134 of the piston 133 from the inside of the cylinder 131 in the second direction L2.

The spring 151 is disposed between the piston 133 and the cylinder 131. The spring 151 biases the piston 133 with respect to the cylinder 131 in the second direction L2. The spring 151 is a compression coil spring and is disposed coaxially with the piston 133. The spring 151 is formed to have a diameter smaller than an inner peripheral surface of the medium diameter portion 135 of the piston 133 and is disposed from the inside of the cylinder 131 to the inside of the piston 133. A first seat 152 is installed on an end portion (a second end portion) of the spring 151 in the first direction L1. The spring 151 presses the cylinder 131 via the first seat 152 at an end portion thereof in the first direction L1. The first seat 152 includes a tubular portion 152a which is inserted inside the end portion of the spring 151 in the first direction L1 and a flange portion 152b which protrudes radially outward from an end portion of the tubular portion 152a in the first direction L1. The flange portion 152b covers the end portion of the spring 151 in the first direction L1 from the first direction L1. The flange portion 152b is interposed between the end portion of the spring 151 in the first direction L1 and the bottom wall of the cylinder 131. A second seat 153 is installed on an end portion (a first end portion) of the spring 151 in the second direction L2. The spring 151 presses the cylinder 133 via the second seat 153 at an end portion thereof in the second direction L2. The second seat 153 is formed in the same manner as the first seat 152 and is interposed between the end portion of the spring 151 in the second direction L2 and the third stepped surface 133b of the piston 133.

A packing 155 is disposed between the piston holding portion 117 and the reactive force generation device 130. The packing 155 is a flexible sheet-like member. The packing 155 is formed in an annular shape when seen from the second direction L2. An outer peripheral portion of the packing 155 is airtightly fitted to the second groove 122 of the piston holding portion 117. An inner peripheral portion of the packing 155 is airtightly fitted to the third groove 137a of the piston 133. Thus, the packing 155 covers a sliding portion of the piston 133 from the second direction L2.

Clutch Lever

As shown in FIG. 3, the clutch lever 51 is a clutch operator operated by an occupant.

The clutch lever 51 is disposed in front of the left grip portion 5a.

As shown in FIG. 6, the clutch lever 51 includes a lever body 60 which is touched and operated by the occupant, a knocker 70 which is provided separately from the lever body 60, engages with the lever body 60 and rotates together with the lever body 60, and a support shaft 90 which is disposed coaxially with the rotation axis O and rotates around the rotation axis O together with the lever body 60 and the knocker 70.

As shown in FIGS. 6 and 8, the knocker 70 is disposed between the upper support portion 114 and the lower support portion 115 of the lever support portion 113. The knocker 70 is provided with respect to the lever support portion 113 to be rotatable around the rotation axis O. The knocker 70 is formed to have a U-shaped cross section which opens in a predetermined direction orthogonal to the axial direction and into which a rotation base portion 61 of the lever body 60 which will be described later is inserted. The knocker 70 engages with the lever body 60 at a first location in the predetermined direction with respect to the rotation axis O and engages with the reactive force generation device 130 at a second position in a direction opposite to the predetermined direction with respect to the rotation axis O. The knocker 70 includes a base portion 71 supported by the support shaft 90, a first arm 74 and a second arm 77 which extend from the base portion 71, and a roller 80 supported by the first arm 74.

As shown in FIG. 8, a support shaft insertion hole 72 into which the support shaft 90 is inserted is formed in the base portion 71. The support shaft insertion hole 72 passes through the base portion 71 along the rotation axis O. The support shaft insertion hole 72 is formed in a circular shape when seen in the axial direction. The support shaft insertion hole 72 is splined so that the knocker 70 and the support shaft 90 can rotate integrally.

As shown in FIG. 6, the first arm 74 extends rearward and inward in the vehicle width direction from the base portion 71 when seen in the vertical direction. The first arm 74 extends from the base portion 71 in a direction orthogonal to the axial direction. A tip of the first arm 74 is provided to face the tip end surface 138 of the piston 133. The tip of the first arm 74 is formed in a bifurcated shape branching on both sides in the axial direction and rotatably supports the roller 80 between two branches (refer to FIG. 8). The roller 80 is rotatably provided around an axis parallel to the rotation axis O. The roller 80 is in contact with the tip end surface 138 of the piston 133. The roller 80 is in contact with the tip end surface 138 of the piston 133 from the upstream side in an operation direction G. Accordingly, the knocker 70 engages with the reactive force generation device 130. As the knocker 70 rotates, the roller 80 rolls on the tip end surface 138 of the piston 133 to pass over the air bleeding hole 139. That is, the air bleeding hole 139 is formed in a region of the piston 133 with which the roller 80 comes into contact.

The second arm 77 extends from the base portion 71 on the side opposite to the first arm 74. That is, the second arm 77 extends forward and outward in the vehicle width direction from the base portion 71 when seen in the vertical direction. The second arm 77 extends from the base portion 71 in a direction orthogonal to the axial direction.

As shown in FIGS. 6 and 8, a main body accommodating portion 78 in which the rotation base portion 61 of the lever body 60 is accommodated is formed in the knocker 70. The main body accommodating portion 78 is a recessed portion formed in a front surface of the knocker 70. The main body accommodating portion 78 is recessed rearward and opens forward in a direction orthogonal to the axial direction. Thus, as described above, the knocker 70 is formed in a U-shaped cross section which opens in the direction orthogonal to the axial direction. The main body accommodating portion 78 is formed from the second arm 77 to the base portion 71. The main body accommodating portion 78 includes a top surface 78a and a bottom surface 78b which extend in the vertical plane of the rotation axis O, and a side surface 78c which extends in the axial direction. The top surface 78a is formed in a planar shape which faces downward in the axial direction. The bottom surface 78b is formed in a planar shape which faces upward in the axial direction. The top surface 78a and the bottom surface 78b extend parallel to each other. The side surface 78c is formed by, for example, a flat surface and a curved surface. The side surface 78c extends to surround the support shaft insertion hole 72 when seen in the axial direction.

As shown in FIG. 6, the knocker 70 further includes a contact portion 82. The contact portion 82 protrudes from the base portion 71 in a direction orthogonal to the axial direction. The contact portion 82 extends forward and inward in the vehicle width direction from the base portion 71 when seen in the vertical direction. A tip end portion of the contact portion 82 is in contact with a portion of the piston holding portion 117 of the lever holder 110 which faces downstream in the operation direction G. Rotation of the knocker 70 in a direction opposite to the operation direction G is restricted by bringing the contact portion 82 into contact with the piston holding portion 117. That is, when the contact portion 82 is in contact with the piston holding portion 117, the knocker 70 is located at an end portion of a rotation range on the upstream side in the operation direction G.

As shown in FIGS. 6 and 8, the lever body 60 includes the rotation base portion 61 supported by the support shaft 90, and an operating portion 63 which extends from the rotation base portion 61 toward the front of the left grip portion 5a. The rotation base portion 61 is inserted into the main body accommodating portion 78 of the knocker 70 and is sandwiched by the knocker 70 from both sides in the axial direction. The rotation base portion 61 is slidably in close contact with the top surface 78a of the main body accommodating portion 78 of the knocker 70. The rotation base portion 61 is in close contact with the bottom surface 78b of the main body accommodating portion 78 of the knocker 70 via a leaf spring 108 of the adjustment mechanism 100 described later. Thus, the rotation base portion 61 is in close contact with the knocker 70 directly or via another member at a plurality of locations in the axial direction. A support shaft insertion hole 65 is formed in the rotation base portion 61. The support shaft insertion hole 65 passes through the rotation base portion 61 along the rotation axis O. The support shaft insertion hole 65 is formed in a circular shape when seen in the axial direction.

As shown in FIG. 6, the operating portion 63 extends outward from a front portion of the rotation base portion 61 in the vehicle width direction. An inner end portion of the operating portion 63 in the vehicle width direction faces the contact portion 82 of the knocker 70 at a distance from the downstream side in the operation direction G. A return spring accommodating portion 67 is formed at the inner end portion of the operating portion 63 in the vehicle width direction. The return spring accommodating portion 67 is formed on a side surface which faces upstream in the operation direction G. The return spring accommodating portion 67 is a recessed portion which opens upstream in the operation direction G. The return spring accommodating portion 67 is formed at a position at which it faces the contact portion 82 of the knocker 70. A return spring 86 which is a compression coil spring is inserted into the return spring accommodating portion 67. The return spring 86 biases the lever body 60 with respect to the knocker 70 in the operation direction G.

An adjustment mechanism 100 is interposed between the lever body 60 and the knocker 70. The adjustment mechanism 100 is a mechanism which adjusts a grip distance between the grip portion 5a and the lever body 60. The adjustment mechanism 100 includes an adjustment pin 101 rotatably installed on the second arm 77 of the knocker 70, a cam contact member 106 installed on the lever body 60, and the leaf spring 108 assembled to the adjustment pin 101.

As shown in FIGS. 6 and 8, the adjustment pin 101 is provided to be rotatable around an axis parallel to the axial direction. The adjustment pin 101 includes a cam clutch portion 102 disposed in the main body accommodating portion 78 of the knocker 70, a shaft portion 103 which extends from the cam clutch portion 102 to both sides in the axial direction, and an operation dial 104 provided on the shaft portion 103. The cam clutch portion 102 is disposed downstream in the operation direction G with respect to the operating portion 63 of the lever body 60. The cam clutch portion 102 is formed in a polygonal shape (a pentagonal shape in the embodiment) when seen in the axial direction. The cam clutch portion 102 has a plurality of (five in the embodiment) cam surfaces 102a on the outer periphery thereof. The plurality of cam surfaces 102a are provided at different distances from a center axis of the adjustment pin 101. The shaft portion 103 is rotatably supported by the second arm 77 of the knocker 70 on both the upper and lower sides with the cam clutch portion 102 interposed therebetween. The operation dial 104 is provided at an upper end portion of the shaft portion 103. The operation dial 104 is disposed along an upper surface of the second arm 77 of the knocker 70. The operation dial 104 can be rotated by an occupant.

As shown in FIG. 6, the cam contact member 106 is a member having a cam contact surface 106a which is in contact with the cam surface 102a of the cam clutch portion 102. The cam contact surface 106a is in contact with any one of the plurality of cam surfaces 102a of the cam clutch portion 102 from the upstream side in the operation direction G. Thus, the lever body 60 engages with the knocker 70. Since the lever body 60 is biased in the operation direction G by the return spring 86, the lever body 60 always engages with the knocker 70.

As shown in FIGS. 6 and 8, the leaf spring 108 has a bifurcated arm formed at a tip end thereof and a hole formed at a base end thereof through which the support shaft 90 is inserted. The base end of the leaf spring 108 is sandwiched between the rotation base portion 61 of the lever body 60 and the bottom surface 78b of the main body accommodating portion 78 of the knocker 70. The tip end of the leaf spring 108 is disposed between the cam clutch portion 102 and the bottom surface 78b of the main body accommodating portion 78 of the knocker 70. The bifurcated arm at the tip end of the leaf spring 108 is disposed to sandwich the shaft portion 103. The leaf spring 108 biases the adjustment pin 101 upward in the axial direction with respect to the knocker 70.

As shown in FIG. 8, the support shaft 90 is a bolt having a screw shaft 91 provided at a tip thereof. The support shaft 90 is inserted into the through hole 113a of the lever holder 110 and the support shaft insertion holes 72 and 65 of the clutch lever 51 from below. The screw shaft 91 protrudes above the lever holder 110. The support shaft 90 supports the lever body 60 to be relatively rotatable. The support shaft 90 supports the knocker 70 so that the knocker 70 cannot rotate relatively. A stepped surface 92 which faces upward in the axial direction is formed on an outer peripheral surface of the support shaft 90. The stepped surface 92 extends along a vertical surface of the rotation axis O.

The support shaft 90 is installed on the lever holder 110 by screwing a nut 93 onto the screw shaft 91. The stepped surface 92 of the support shaft 90 is in contact with the top surface 78a of the main body accommodating portion 78 of the knocker 70 as a seating surface. The nut 93 is fastened to the base portion 71 of the knocker 70 via a cylindrical first spacer 94 externally inserted onto an upper portion of the support shaft 90. Thus, the base portion 71 of the knocker 70 is fixed to the support shaft 90 by a fastening force of the nut 93 in a state in which it is sandwiched between the stepped surface 92 of the support shaft 90 and the first spacer 94. The upper portion of the support shaft 90 is slidably supported by the upper support portion 114 of the lever holder 110 via a first bush 95 externally inserted onto the first spacer 94. The lower portion of the support shaft 90 is slidably supported by the lower support portion 115 of the lever holder 110 via a cylindrical second spacer 96 externally inserted onto the lower portion of the support shaft 90 and a second bush 97 externally inserted onto the second spacer 96.

Rotation Sensor

The rotation sensor 160 converts an operation amount of the clutch lever 51 into an electric signal and outputs the electric signal. For example, the rotation sensor 160 is a so-called potentiometer. The rotation sensor 160 is disposed below the lever body 60. The rotation sensor 160 is installed on the lever holder 110. The rotation sensor 160 is fastened to the rotation sensor holding portion 124 with a bolt or the like in a state in which part of the rotation sensor 160 is inserted into the recessed portion 124a of the rotation sensor holding portion 124. The rotation detector 161 of the rotation sensor 160 is disposed coaxially with a rotation center (the rotation axis O) of the clutch lever 51 and is integrally rotatably connected to a lower end portion of the support shaft 90. The rotation sensor 160 detects a rotation angle of the knocker 70 which rotates integrally with the support shaft 90 by detecting a rotation angle of the support shaft 90. Since the knocker 70 rotates integrally with the lever body 60, the rotation sensor 160 can directly detect the operation amount of the clutch lever 51. The operation amount of the clutch lever 51 detected by the rotation sensor 160 is input to the ECU 40.

Operation of Clutch Lever Device

Next, an operation of the clutch lever device of the embodiment will be described with reference to FIG. 9.

Figure 9:
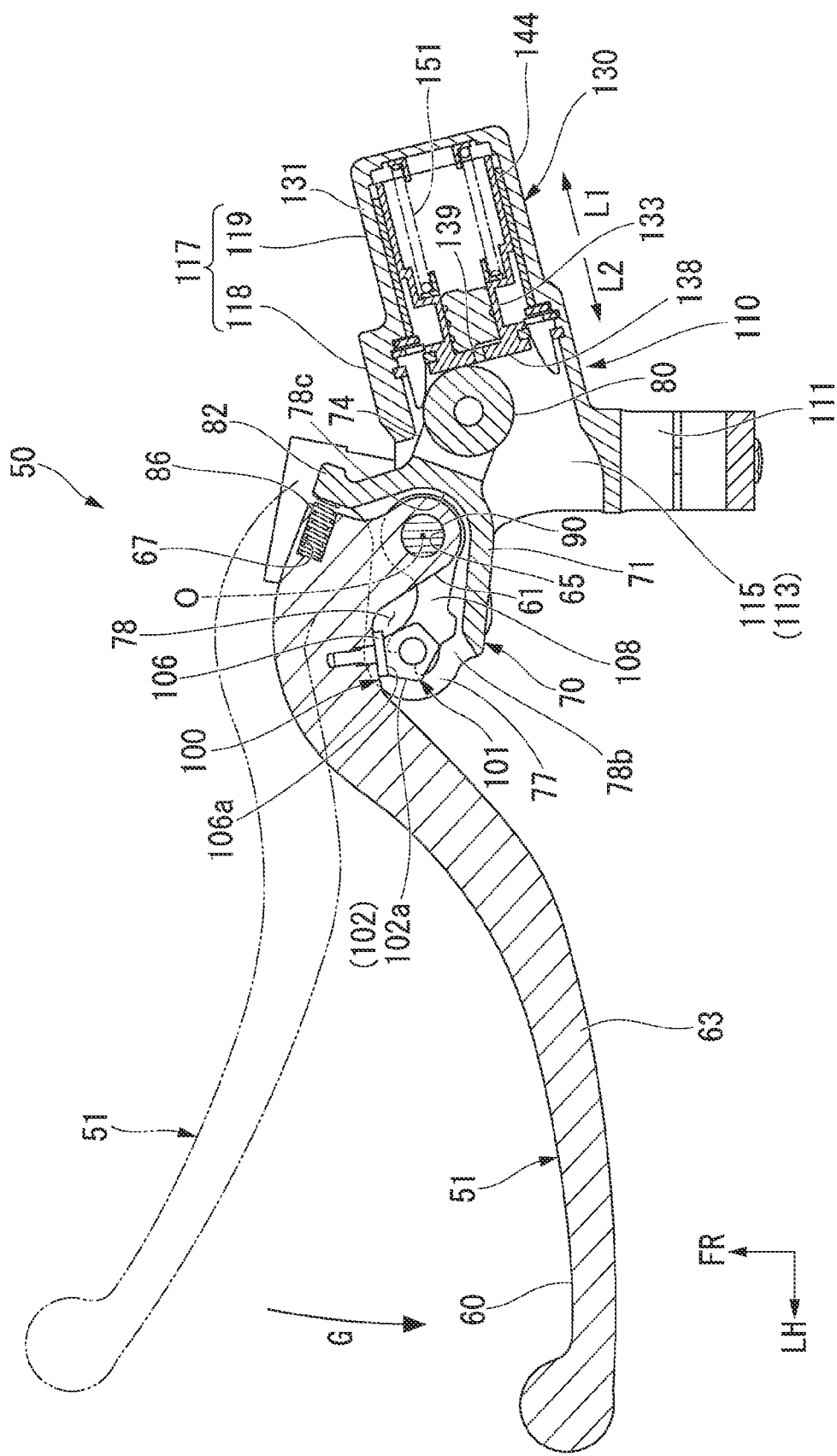
FIG. 9 is an operation explanatory view of the clutch lever device of the first embodiment.

FIG. 9 is an operation explanatory view of the clutch lever device of the first embodiment, and is a partial cross-sectional view of the clutch lever device when seen from above.

When the power transmission of the clutch device 26 is cut off, the lever body 60 is operated to rotate in the operation direction G with respect to the pre-operation position. When the lever body 60 rotates in the operation direction G, the knocker 70 which engages with the lever body 60 also rotates in the operation direction G together with the lever body 60. When the knocker 70 rotates in the operation direction G, the roller 80 is displaced in the operation direction G and presses the piston 133 in the first direction L1 while rolling on the tip end surface 138 of the piston 133. The reactive force generation device 130 contracts when the piston 133 is pressed in the first direction L1.

The piston 133 is biased in the second direction L2 by the spring 151. Therefore, a force in a direction opposite to the operation direction G acts on the roller 80. That is, the reactive force generation device 130 presses the knocker 70 to rotate the knocker 70 in the direction opposite to the operation direction G. When the knocker 70 is pressed in the direction opposite to the operation direction G, the lever body 60 which engages with the knocker 70 is also pressed in the direction opposite to the operation direction G. Thus, an operation reactive force is generated on the lever body 60. When the occupant releases the operation of the lever body 60, the lever body 60 rotates together with the knocker 70 in the direction opposite to the operation direction G and returns to the pre-operation position.

Here, when the reactive force generation device 130 expands and contracts, an internal volume of the piston structure constituted of the cylinder 131 and the piston 133 changes. Since the air bleeding hole 139 which allows communication between the inside and the outside of the piston 133 is formed in the bottom wall 136b of the small diameter portion 136 of the piston 133, air can be suctioned into the piston structure, or air inside the piston structure can be discharged according to a change in the internal volume of the piston structure.

As described above, the reactive force generation device 130 of the clutch-by-wire system of the embodiment has the piston structure in which the air bleeding hole 139 is provided and includes a piston 133 which is in contact with the clutch lever 51 and in which the air bleeding hole 139 is formed. With such a constitution, the clutch lever 51 is located in the vicinity of the air bleeding hole 139 by forming the air bleeding hole 139 in the piston 133 which comes into contact with the clutch lever 51. Therefore, the air bleeding hole 139 is disposed at a position at which it is difficult to access from the outside because it is obstructed by the clutch lever 51. Therefore, it is possible to curb entry of foreign substances such as water and dust into the piston structure through the air bleeding hole 139.

Particularly, in the embodiment, since the air bleeding hole 139 opens into the space surrounded by the lever holder 110, it is possible to effectively curb entry of foreign substances such as water and dust into the piston structure, as compared with a configuration in which the piston structure opens to the outside.

Further, the piston 133 has the tip end surface 138 which comes into contact with the clutch lever 51 and in which the air bleeding hole 139 opens. The tip end surface 138 of the piston 133 faces rearward. With such a constitution, since the air bleeding hole 139 opens rearward, it is possible to curb entry of foreign substances into the piston structure through the air bleeding hole 139 when the vehicle is traveling, as compared with a constitution in which the air bleeding hole opens forward.

Further, the roller 80 of the clutch lever 51 rolls on the tip end surface 138 of the piston 133 as the clutch lever 51 is operated. With such a constitution, the air bleeding hole 139 is provided at a position at which it is closer to the clutch lever 51. Therefore, the air bleeding hole 139 is disposed at a position at which it is more difficult to access from the outside. Therefore, it is possible to curb entry of foreign substances such as water and dust into the piston structure through the air bleeding hole 139.

Further, the air bleeding hole 139 is formed in a region in which it comes into contact with the roller 80. With such a constitution, since the air bleeding hole 139 is blocked by the roller 80 when the clutch lever 51 is operated, it is possible to curb entry of foreign substances into the piston structure through the air bleeding hole 139 when the clutch lever 51 is operated.

Further, the labyrinth structure which obstructs a flow of a fluid through the air bleeding hole 139 is formed on the piston 133. With such a constitution, it is possible to effectively curb entry of foreign substances such as water and dust into the piston structure through the air bleeding hole 139.

Further, the labyrinth structure has the flow passage 142 which communicates with the air bleeding hole 139 and extends spirally. With such a constitution, for example, as compared with a constitution in which the flow passage extends linearly, it is possible to effectively curb advance of foreign substances, such as water or dust which has entered the air bleeding hole 139, through the flow passage 142. Therefore, it is possible to curb entry of foreign substances into the piston structure.

Second Embodiment

Next, a clutch lever device 250 of a second embodiment will be described with reference to FIGS. 10 to 14. In the second embodiment, detailed description of the portions having the same constitutions as those of the first embodiment will be omitted.

Lever Holder

Figure 10:
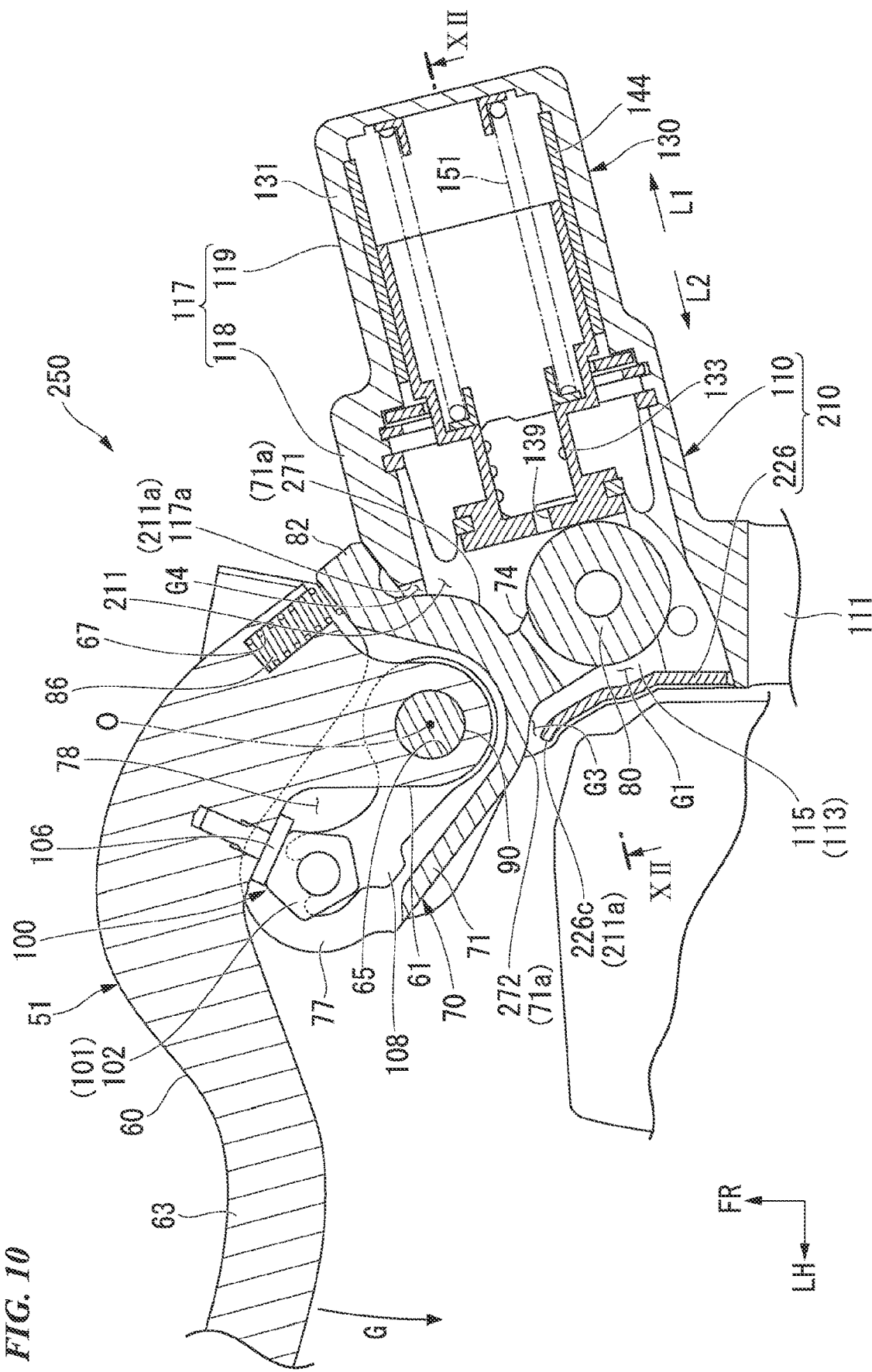
FIG. 10 is a cross-sectional view of a clutch lever device of a second embodiment when seen from above.
Figure 11:
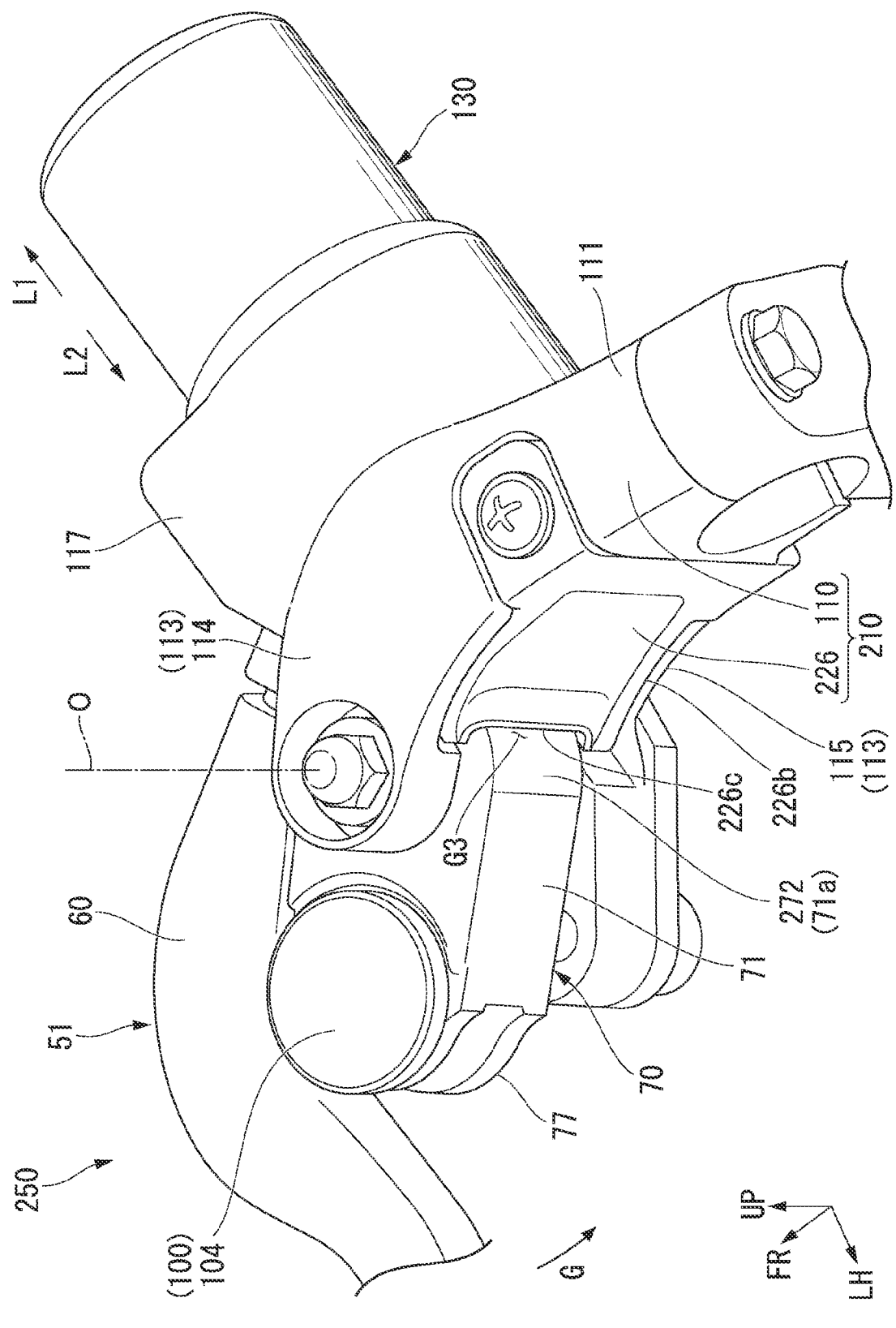
FIG. 11 is a perspective view of the clutch lever device of the second embodiment when seen from above and behind.

FIG. 10 is a cross-sectional view of the clutch lever device of the second embodiment when seen from above. FIG. 11 is a perspective view of the clutch lever device of the second embodiment when seen from above and behind.

As shown in FIGS. 10 and 11, the clutch lever device 250 of the second embodiment includes a lever holder 210 in place of the lever holder 110 of the first embodiment. The lever holder 210 has a constitution in which a cover 226 is installed on the lever holder 110 of the first embodiment. In the embodiment, in the lever holder 210, a member corresponding to the lever holder 110 of the first embodiment is referred to as a holder body 110. The cover 226 is disposed to define a space, in which a contact portion in which the clutch lever 51 and the piston 133 are in contact with each other is disposed, from the side opposite to the piston holding portion 117. The cover 226 is disposed on the side opposite to the piston holding portion 117 with the lever support portion 113 interposed therebetween when seen in the vertical direction and is fixed to the holder body 110 with screws or the like. The cover 226 is disposed upstream in the operation direction G with respect to the first arm 74 and the roller 80 in the knocker 70 of the clutch lever 51. The cover 226 is formed to provide a first gap G1 with respect to the first arm 74 and the roller 80 of the clutch lever 51 at the pre-operation position.

Figure 12:
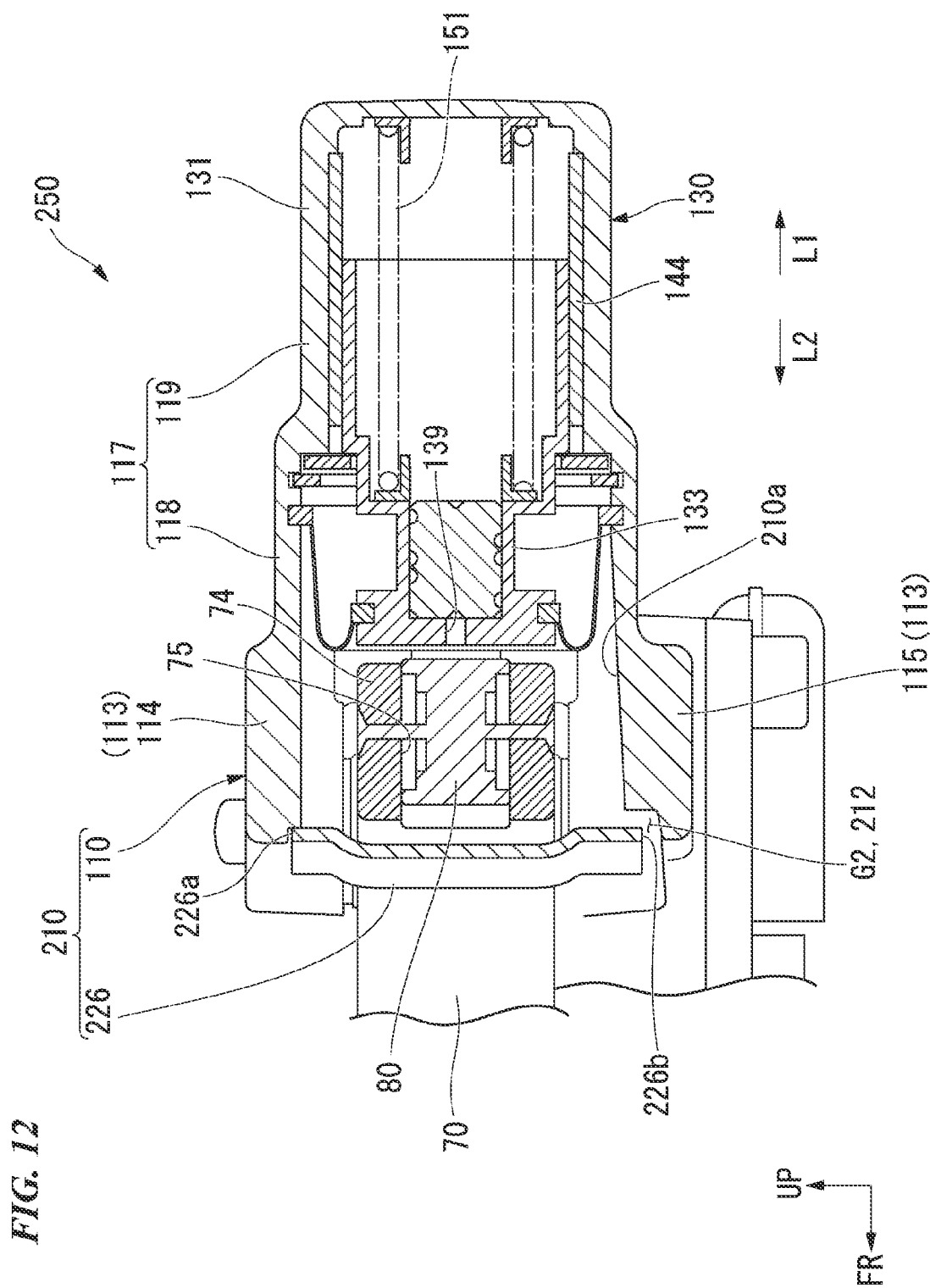
FIG. 12 is a cross-sectional view of a portion corresponding to line XII-XII of FIG. 10.

FIG. 12 is a cross-sectional view of a portion corresponding to line XII-XII of FIG. 10.

As shown in FIGS. 10 to 12, the cover 226 is formed in a rectangular shape having four sides which extend in the vertical direction or a forward and rearward direction when seen in the vehicle width direction. A rear end portion of the cover 226 is disposed to be close to a front end portion of a surface of the fixed portion 111 which faces outward in the vehicle width direction. The cover 226 extends forward from the rear end portion thereof along end surfaces of the upper support portion 114 and the lower support portion 115 of the lever support portion 113 which face outward in the vehicle width direction. An upper end edge 226a of the cover 226 is disposed to be in contact with the upper support portion 114 of the lever support portion 113. A lower end edge 226b of the cover 226 is formed to provide a second gap G2 with respect to the lower support portion 115 of the lever support portion 113. A front end edge 226c of the cover 226 is formed to provide a third gap G3 with respect to an outer peripheral surface of the base portion 71 of the knocker 70 of the clutch lever 51 as a whole. The outer peripheral surface of the base portion 71 of the knocker 70 is a surface of the base portion 71 which faces outward in a radial direction. A maximum distance of each of the second gap G2 and the third gap G3 is smaller than a minimum distance of the first gap G1.

As shown in FIG. 10, an opening portion 211 into which the clutch lever 51 is inserted is formed in the lever holder 210. The opening portion 211 allows communication between the outside and the space in which the contact portion in which the clutch lever 51 and the piston 133 come into contact with each other is disposed. The first arm 74 of the knocker 70 is inserted into the opening portion 211. In the embodiment, an opening edge 211a of the opening portion 211 includes a front portion 117a of an opening edge of the piston holding portion 117 (an opening edge of the first tubular portion 118) and a front end edge 226c of the cover 226 as portions which radially face the outer peripheral surface of the base portion 71 of the knocker 70. The front portion 117a of the opening edge of the piston holding portion 117 is a front opening edge of the opening portion 211. The front end edge 226c of the cover 226 is a rear opening edge of the opening portion 211.

As shown in FIG. 12, the lever holder 210 has a lower surface 210a which defines the space, in which a contact portion in which the clutch lever 51 and the piston 133 come into contact with each other is disposed, from below. In the embodiment, the lower surface 210a is an upper surface of the lower support portion 115 of the lever support portion 113. A communication portion 212 which allows communication between the inside and outside of the lever holder 210 is formed at an outer end portion of the lower surface 210a in the vehicle width direction. The communication portion 212 is the above-described second gap G2. The lower surface 210a is inclined with respect to the horizontal direction to descend toward the communication portion 212. An outer end portion of the lower surface 210a in the vehicle width direction is lowered by one step via a stepped surface which extends in the vertical direction. The outer end portion of the lower surface 210a in the vehicle width direction is inclined at a larger angle with respect to the horizontal direction than the other portions of the lower surface 210a.

Clutch Lever

As shown in FIG. 10, the base portion 71 of the knocker 70 of the clutch lever 51 includes a facing surface 71a which radially faces the opening edge 211a of the opening portion 211 of the lever holder 210. The facing surface 71a has a first facing surface 271 which faces the front portion 117a of the opening edge of the piston holding portion 117, and a second facing surface 272 which faces the front end edge 226c of the cover 226.

Figure 13:
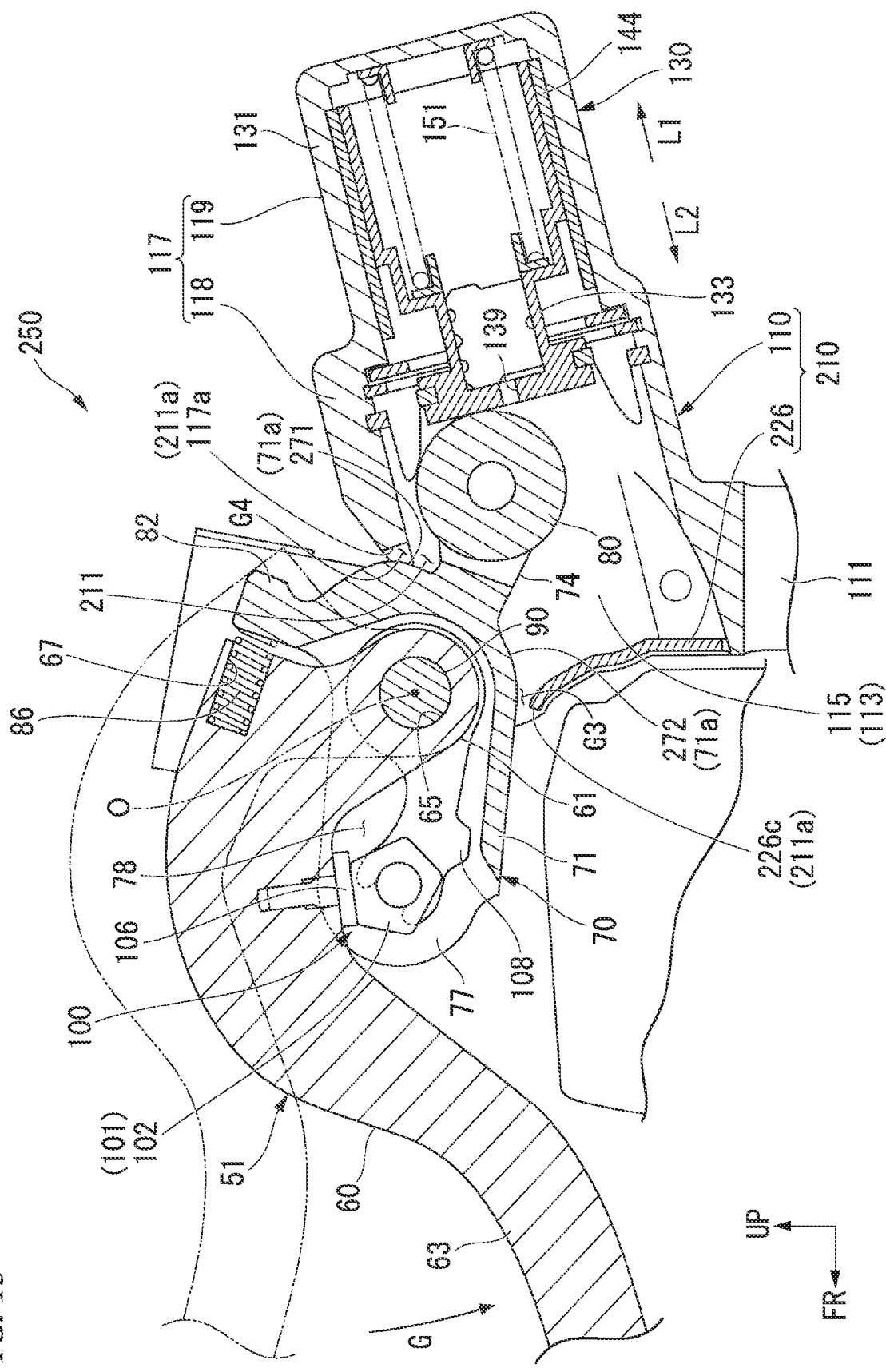
FIG. 13 is a cross-sectional view of a clutch lever device of the second embodiment when seen from above.
Figure 14:
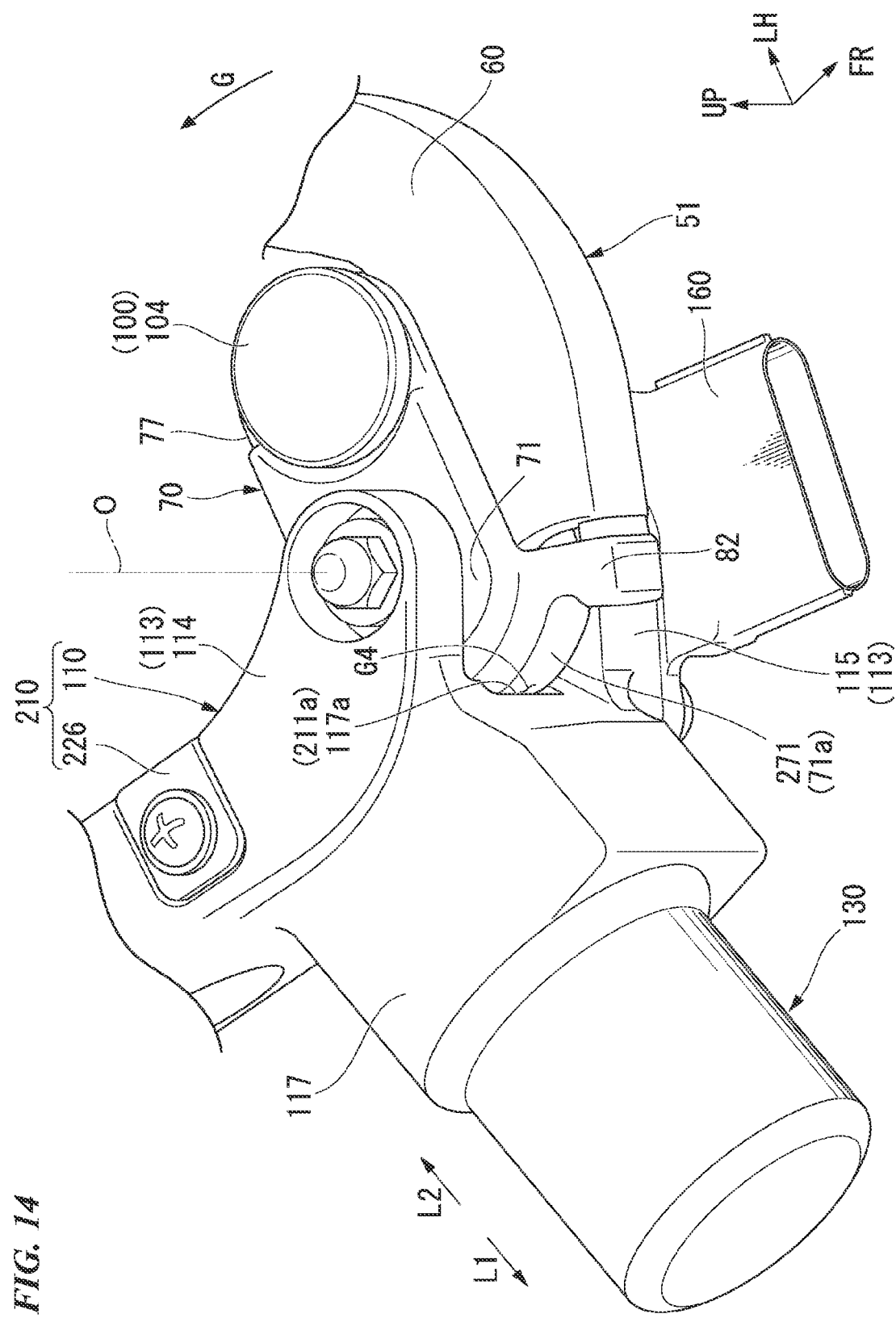
FIG. 14 is a perspective view of the clutch lever device of the second embodiment when seen from above and in front.

FIG. 13 is a cross-sectional view of a clutch lever device of the second embodiment when seen from above and shows in a state in which the clutch lever is completely gripped. FIG. 14 is a perspective view of the clutch lever device of the second embodiment when seen from above and in front.

As shown in FIGS. 10, 13 and 14, the first facing surface 271 is provided downstream in the operation direction G with respect to the first arm 74 of the knocker 70. The first facing surface 271 continuously faces the front portion 117a of the opening edge of the piston holding portion 117 from a state in which the clutch lever 51 is not being operated to a state in which the clutch lever 51 is being operated. Specifically, the first facing surface 271 is provided from a location at which it faces the front portion 117a of the opening edge of the piston holding portion 117 in a state in which the clutch lever 51 is in the pre-operation position to a location at which it faces the front portion 117a of the opening edge of the piston holding portion 117 in a state in which the clutch lever 51 is completely gripped. The first facing surface 271 is formed to provide a fourth gap G4 with respect to the front portion 117a of the opening edge of the piston holding portion 117. The first facing surface 271 extends in an arc shape centered on the rotation axis O when seen in the axial direction. In the embodiment, the first facing surface 271 extends with a constant curvature about the rotation axis O. Thus, the first facing surface 271 keeps a distance of the fourth gap G4 constant regardless of the amount of operation of the clutch lever 51. A maximum distance of the fourth gap G4 is smaller than the minimum distance of the first gap G1.

As shown in FIGS. 10, 11 and 13, the second facing surface 272 is provided upstream the operation direction G with respect to the first arm 74 of the knocker 70. The second facing surface 272 continuously faces the front end edge 226c of the cover 226 from the state in which the clutch lever 51 is not being operated to the state in which the clutch lever 51 is being operated. Specifically, the second facing surface 272 is provided from a location at which it faces the front end edge 226c of the cover 226 in the state in which the clutch lever 51 is in the pre-operation position to a location at which it faces the front end edge 226c of the cover 226 in the state where the clutch lever 51 is completely gripped. The second facing surface 272 is formed to provide the above-described third gap G3 with respect to the front end edge 226c of the cover 226. The second facing surface 272 extends in an arc shape centered on the rotation axis O when seen in the axial direction. In the embodiment, the second facing surface 272 extends with a constant curvature about the rotation axis O. Thus, the second facing surface 272 keeps the distance of the third gap G3 constant regardless of the amount of operation of the clutch lever 51.

The clutch lever device 250 of the above-described embodiment exhibits the following effects in addition to the same effects as those in the first embodiment.

In the embodiment, the opening portion 211 into which the clutch lever 51 is inserted is formed in the lever holder 210. The clutch lever 51 has the facing surface 71a which radially faces the opening edge 211a of the opening portion 211. The facing surface 71a continuously faces the opening edge 211a of the opening portion 211 from the state in which the clutch lever 51 is not being operated to the state in which the clutch lever 51 is being operated, and extends in an arc shape centered on the rotation axis O when seen in the axial direction. With such a constitution, the distance of each of the gaps G3 and G4 between the clutch lever 51 and the opening edge 211a of the lever holder 210 can be kept constant regardless of the amount of operation of the clutch lever 51. Thus, it is possible to curb easy entry of foreign substances into the lever holder 210 by operating the clutch lever 51 as the gap between the clutch lever 51 and the opening edge 211a of the lever holder 210 changes. Therefore, it is possible to curb occurrence of defects such as biting of foreign substances.

Further, the facing surface 71a has a first facing surface 271 which faces the front opening edge of the opening portion 211 (the front portion 117a of the opening edge of the piston holding portion 117). With such a constitution, it is possible to effectively curb entry of foreign substances or the like approaching the lever holder 210 from the side in front into the lever holder 210, for example, when the vehicle is traveling.

Further, the lever holder 210 includes a lower surface 210a which defines a space, in which a contact portion where the clutch lever 51 and the piston 133 come into contact is disposed, from below. The communication portion 212 which allows communication between the inside and outside of the lever holder 210 is formed in the lower surface 210a. The lower surface 210a is inclined to descend toward the communication portion 212. With such a constitution, foreign substances which have entered the space in which the contact portion in which the clutch lever 51 and the piston 133 come into contact with each other is disposed can be smoothly guided to the communication portion 212 by an inclination of the lower surface 210a of the lever holder 210.

Therefore, even when foreign substances have entered the inside of the lever holder 210, the foreign substances can be effectively discharged through the communication portion 212, and occurrence of defects such as the biting of the foreign substances can be curbed.

Third Embodiment

Next, a clutch lever device 350 of a third embodiment will be described with reference to FIG. 15. In the third embodiment, detailed description of the portions having the same constitutions as those of the first embodiment will be omitted.

Reactive Force Generation Device

Figure 15:
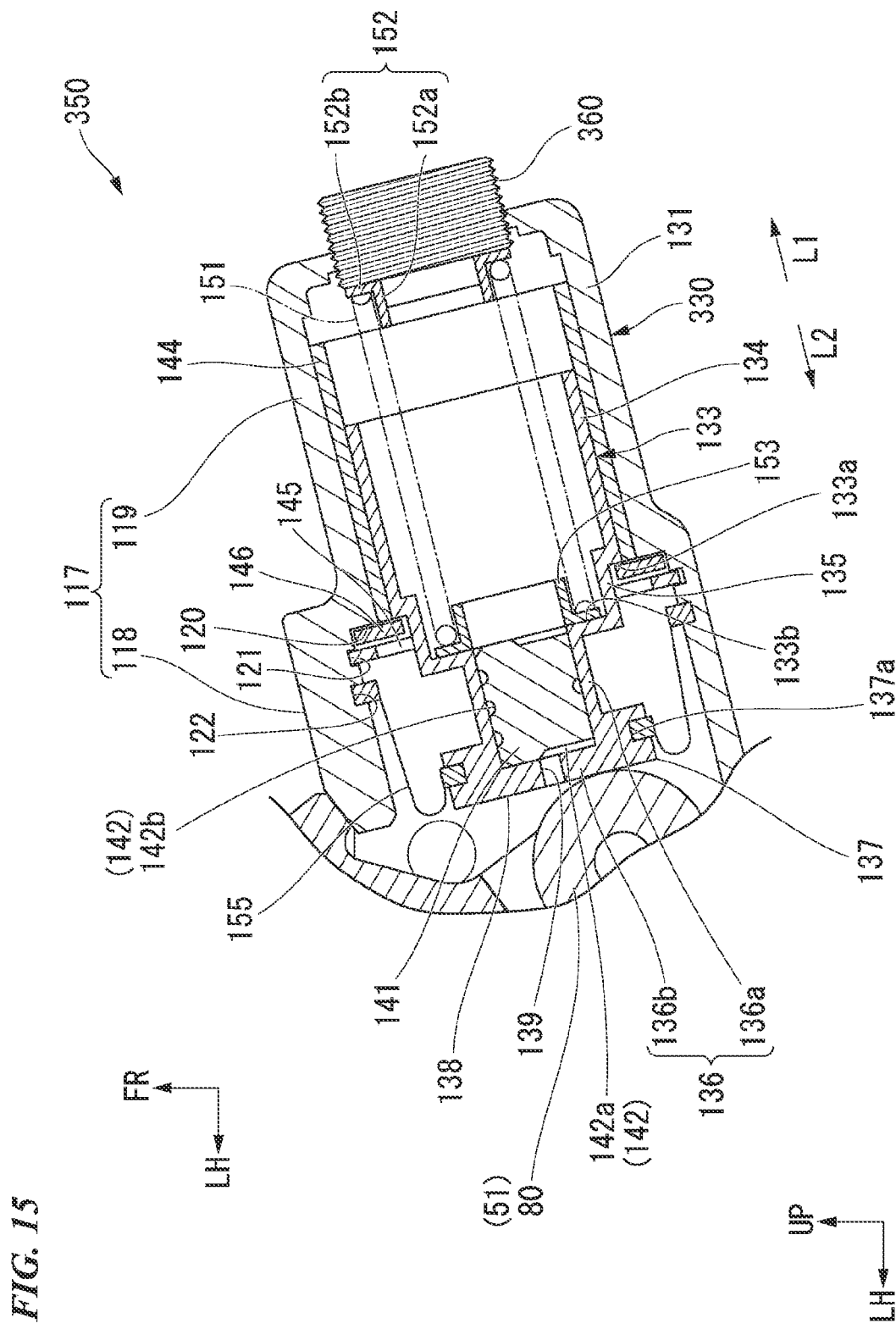
FIG. 15 is an enlarged cross-sectional view of a clutch lever device of a third embodiment.

FIG. 15 is an enlarged cross-sectional view of the clutch lever device of the third embodiment.

As shown in FIG. 15, the reactive force generation device 330 of the third embodiment is different from the reactive force generation device 130 of the first embodiment in that it includes an adjuster 360 for adjusting a biasing force of the spring 151. The adjuster 360 is provided on a bottom wall of the cylinder 131. Specifically, the adjuster 360 is formed in a cylindrical shape and is tightly inserted into a through hole formed in the bottom wall of the cylinder 131. A female screw is formed in the through hole of the bottom wall of the cylinder 131, a male screw is formed on an outer peripheral surface of the adjuster 360, and the adjuster 360 is screwed to the bottom wall of the cylinder 131. For example, a groove into which a driver or the like is inserted is formed in an end surface of the adjuster 360 in the first direction L1. The adjuster 360 can be displaced in the first direction L1 and the second direction L2 with respect to the cylinder 131 by rotating with respect to the bottom wall of the cylinder 131. The first seat 152 is in contact with an end surface of the adjuster 360 in the second direction L2. The adjuster 360 is pressed against the end portion of the spring 151 in the first direction L1 via the first seat 152. The adjuster 360 can adjust the biasing force of the spring 151 by being displaced with respect to the cylinder 131 in the first direction L1 or the second direction L2 and causing the end portion of the spring 151 in the first direction L1 to be close to or far away from the end portion of the spring 151 in the second direction L2.

The clutch lever device 350 of the above-described embodiment exhibits the following effects in addition to the same effects as those of the first embodiment.

In the embodiment, the reactive force generation device 330 includes the adjuster 360 which causes the end portion of the spring 151 in the first direction L1 to be close to or far away from the end portion thereof in the second direction L2. With such a constitution, the adjuster 360 can change a length between both end portions of the spring 151 to adjust a force for pressing the piston 133. Therefore, it is possible to provide the reactive force generation device 330 which can freely change the reactive force applied to the clutch lever 51.

The present invention is not limited to the above-described embodiments described with reference to the drawings, and various modified examples can be considered within the technical scope thereof.

For example, in the above-described embodiment, the second tubular portion 119 of the piston holding portion 117 of the lever holder 110 also serves as the cylinder 131 of the reactive force generation device 130. However, the present invention is not limited thereto. The cylinder of the reactive force generation device may be formed separately from the piston holding portion 117 of the lever holder 110, and may be disposed inside the piston holding portion 117 of the lever holder 110.

Further, in the above-described embodiment, in the reactive force generation device 130, the intermediate tube 144 is disposed between the inner peripheral surface of the cylinder 131 and the outer peripheral surface of the piston 133. However, the present invention is not limited thereto, and the piston may be in direct sliding contact with the cylinder.

Further, in the above-described embodiment, the reactive force generation device 130 is formed so that the piston 133 is displaced with respect to the fixedly provided cylinder 131. However, the present invention is not limited thereto. For example, the reactive force generation device may be formed so that the cylinder externally inserted onto the piston and in contact with the knocker 70 is displaced with respect to the fixedly provided piston. In this case, the same effects as those of the above-described embodiment can be obtained by providing the air bleeding hole in the cylinder.

Further, in the above-described embodiment, the flow passage 142 having the labyrinth structure is constituted of the first labyrinth groove 142a and the second labyrinth groove 142b in the outer surface of the labyrinth member 141. However, the present invention is not limited thereto, and for example, the flow passage having the labyrinth structure may be formed by a groove formed in the inner surface of the small diameter portion of the piston 133.

Further, in the above-described embodiment, the clutch lever 51 includes the lever body 60 and the knocker 70 as separate members. However, the present invention is not limited thereto, and the clutch lever may be one member in which the lever body 60 and the knocker 70 are integrated.

Further, in the above-described embodiment, a so-called normally open type which is in a connected state in which power can be transmitted by supplying a hydraulic pressure in a normally disconnected manner has been exemplified as a clutch device. However, the clutch device is not limited to the normally open type. That is, the clutch device may be a so-called normally closed type which is in a disconnected state in which power cannot be transmitted by supplying a hydraulic pressure in a normally connected manner.

In addition, it is possible to replace the components in the above-described embodiments with well-known components as appropriate without departing from the spirit of the present invention, and the above-described embodiments and modified examples may be appropriately combined. For example, the lever holder 210 of the second embodiment may be combined with the adjuster 360 of the third embodiment.

REFERENCE SIGNS LIST

51 Clutch lever
71a Facing surface
80 Roller
117a Front portion of opening edge (opening edge)
130, 330 Reactive force generation device
131 Cylinder (holding member)
133 Piston (contact member)
139 Air bleeding hole
138 Tip end surface (contact surface)
142 Flow passage
151 Spring (coil spring)
210 Lever holder
210a Lower surface 211 Opening portion
211a Opening edge
212 Communication portion
360 Adjuster
O Rotation axis

What is claim is:
1. A reactive force generation device of a clutch-by-wire system which generates a reactive force on a clutch lever, comprising:
   a piston structure in which an air bleeding hole is provided; and
   a contact member which is in contact with the clutch lever and in which the air bleeding hole is formed, wherein the air bleeding hole is formed in a region in which the clutch lever comes into contact.
2. The reactive force generation device according to claim 1, wherein:
   the contact member has a contact surface which comes into contact with the clutch lever and in which the air bleeding hole opens, and
   the contact surface faces a rear of a vehicle.
3. The reactive force generation device according to claim 1, comprising:
   a holding member which holds the contact member and constitutes a piston structure together with the contact member;
   a coil spring which is interposed between the contact member and the holding member and presses the contact member at a first end portion thereof; and
   an adjuster which is provided on the holding member and causes a second end portion of the coil spring to come closer to and separate from the first end portion.
4. A clutch lever device which comprises the reactive force generation device of the clutch-by-wire system according to claim 1, comprising:
   a clutch lever which rotates around a rotation axis and to which a reactive force is applied by the reactive force generation device; and
   a lever holder which rotatably supports the clutch lever and surrounds a contact portion in which the clutch lever and the contact member come into contact with each other,
   wherein an opening portion into which the clutch lever is inserted is formed in the lever holder,
   the clutch lever has a facing surface while faces an opening edge of the opening portion in a direction orthogonal to the rotation axis, and
   the facing surface continuously faces the opening edge of the opening portion from a state in which the clutch lever is not being operated to a state in which the clutch lever is being operated, and extends in an arc shape centered on the rotation axis when seen in a direction in which the rotation axis extends.
5. The clutch lever device according to claim 4, wherein the facing surface faces a front opening edge of the opening portion.
6. A clutch lever device which comprises the reactive force generation device of the clutch-by-wire system according to claim 1, comprising:
   a clutch lever which rotates around a rotation axis and to which a reactive force is applied by the reactive force generation device; and
   a lever holder which rotatably supports the clutch lever and surrounds a contact portion in which the clutch lever and the contact member come into contact with each other,
   wherein the lever holder includes a lower surface which defines from below a space in which a contact portion in which the clutch lever and the contact member come into contact with each other is disposed,
   a communication portion which allows communication between an inside and an outside the lever holder is formed in the lower surface, and
   the lower surface is inclined to descend toward the communication portion.
7. A reactive force generation device of a clutch-by-wire system which generates a reactive force on a clutch lever, comprising:
   a piston structure in which an air bleeding hole is provided; and
   a contact member which is in contact with the clutch lever and in which the air bleeding hole is formed, wherein:
      the contact member has a contact surface which comes into contact with a roller of the clutch lever and in which the air bleeding hole opens, and
      the roller rolls on the contract surface according to an operation of the clutch lever.
8. The reactive force generation device according to claim 7, wherein the air bleeding hole is formed in a region in which the roller comes into contact.
9. A clutch lever device which comprises the reactive force generation device of the clutch-by-wire system according to claim 7, comprising:
   a clutch lever which rotates around a rotation axis and to which a reactive force is applied by the reactive force generation device; and
   a lever holder which rotatably supports the clutch lever and surrounds a contact portion in which the clutch lever and the contact member come into contact with each other,
   wherein the lever holder includes a lower surface which defines from below a space in which a contact portion in which the clutch lever and the contact member come into contact with each other is disposed,
   a communication portion which allows communication between an inside and an outside lever holder is formed in the lower surface, and
   the lower surface is inclined to descend toward the communication portion.
10. A reactive force generation device of a clutch-by-wire system which generates a reactive force on a clutch lever, comprising:
   a piston structure in which an air bleeding hole is provided; and
   a contact member which is in contact with the clutch lever and in which the air bleeding hole is formed,
   wherein a labyrinth structure which obstructs a flow of a fluid through the air bleeding hole is formed on the contact member.
11. The reactive force generation device according to claim 10, wherein the labyrinth structure has a flow passage which communicates with the air bleeding hole and extends spirally.
12. A clutch lever device which comprises the reactive force generation device of the clutch-by-wire system according to claim 10, comprising:
   a clutch lever which rotates around a rotation axis and to which a reactive force is applied by the reactive force generation device; and
   a lever holder which rotatably supports the clutch lever and surrounds a contact portion in which the clutch lever and the contact member come into contact which each other, wherein the lever holder includes a lower surface which defines from below a space in which contact portion in which the clutch lever and the contact member come into contact with each other is disposed, a communication portion which allows communication between an inside and an outside the lever holder is formed in the lower surface, and the lower surface is inclined to descend toward the communication portion.

* * * * *